US006559853B1

United States Patent
Hashimoto et al.

(10) Patent No.: US 6,559,853 B1
(45) Date of Patent: May 6, 2003

(54) ENVIRONMENT MAP CREATION USING TEXTURE PROJECTIONS WITH POLYGONAL CURVED SURFACES

(75) Inventors: Roy T. Hashimoto, Redwood City, CA (US); Andrew J. Lavin, Palo Alto, CA (US)

(73) Assignee: Enroute, Inc., Palo Alto, CA (US)

( * ) Notice: Subject to any disclaimer, the term of this patent is extended or adjusted under 35 U.S.C. 154(b) by 0 days.

(21) Appl. No.: 09/505,338

(22) Filed: Feb. 16, 2000

(51) Int. Cl.[7] .................................................. G09G 5/00
(52) U.S. Cl. .......................... 345/582; 345/585; 345/419
(58) Field of Search ................................. 345/426, 582, 345/419, 587, 423, 585

(56) References Cited

U.S. PATENT DOCUMENTS

| | | |
|---|---|---|
| 5,130,794 A | 7/1992 | Ritchey |
| 5,185,855 A | 2/1993 | Kato et al. |
| 5,446,833 A | 8/1995 | Miller et al. |
| 5,561,756 A | 10/1996 | Miller et al. |
| 5,704,024 A * | 12/1997 | Voorhies et al. ............. 345/426 |
| 5,754,182 A | 5/1998 | Kobayashi |
| 5,819,016 A | 10/1998 | Watanabe et al. |
| RE36,145 E | 3/1999 | DeAguiar et al. |
| 5,903,273 A | 5/1999 | Mochizuki et al. |
| 5,917,962 A | 6/1999 | Chen et al. |
| 5,923,334 A * | 7/1999 | Luken ......................... 345/423 |
| 5,963,215 A | 10/1999 | Rosenzweig |
| 5,977,988 A | 11/1999 | Greene |
| 5,987,380 A | 11/1999 | Backman et al. |
| 6,005,611 A | 12/1999 | Gullichsen et al. |
| 6,009,190 A | 12/1999 | Szeliski et al. |
| 6,034,691 A | 3/2000 | Aono et al. |
| 6,154,216 A | 11/2000 | Walton |
| 6,191,794 B1 | 2/2001 | Priem et al. |
| 6,229,926 B1 | 5/2001 | Chui et al. |
| 6,236,405 B1 | 5/2001 | Schilling et al. |
| 6,307,557 B1 | 10/2001 | Deering |
| 2001/0050955 A1 | 12/2001 | Zhang et al. |

OTHER PUBLICATIONS

Environment Mapping and Other Applications of World Projections; N. Greene, IEEE Computer Graphics and Applications 6 (11): 21–29, Nov. 1986.
Creating Raster Omnimax Images from Multiple Perspective Views Using the Elliptical Weighted Average Filter; N. Greene, IEEE Computer Graphics and Applications 6 (6): 21–27, Jun. 1986.
"QuickTime VR—An Image–Based Approach to Virtual Environment Navigation"; pp. 29–38; Apple Computer.

* cited by examiner

*Primary Examiner*—Jeffery Brier
*Assistant Examiner*—Faranak Fouladi
(74) *Attorney, Agent, or Firm*—Edward S. Mao; Bever, Hoffmann & Harms

(57) ABSTRACT

An environment map creation system creates an environment map from one or more images representing an environment. The environment map creation system includes a texture projection generation unit, which produces a texture projection having polygonal curved surfaces as facets. An environment map rendering unit uses the texture projection to create the environment map from the one or more images. Specifically, the environment map creation system determines an image area in the one or more images corresponding to each polygonal curved surface. The polygonal curved surface is colored based on the corresponding image area. The environment map is formed from the polygonal curved surfaces which become texels in the environment map.

14 Claims, 23 Drawing Sheets

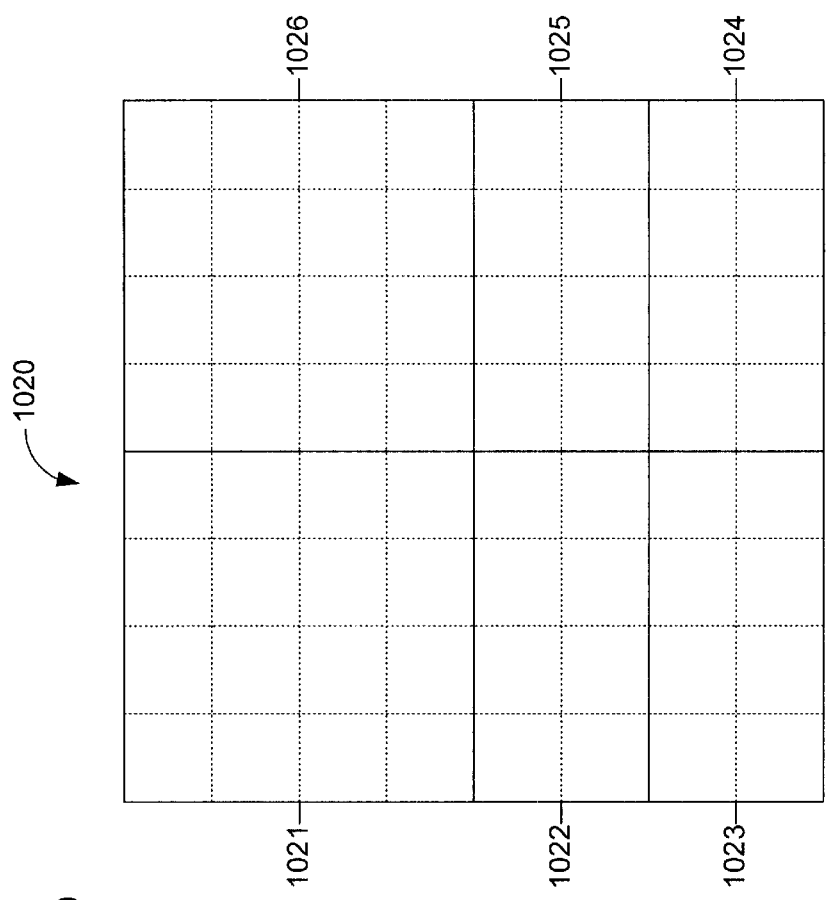
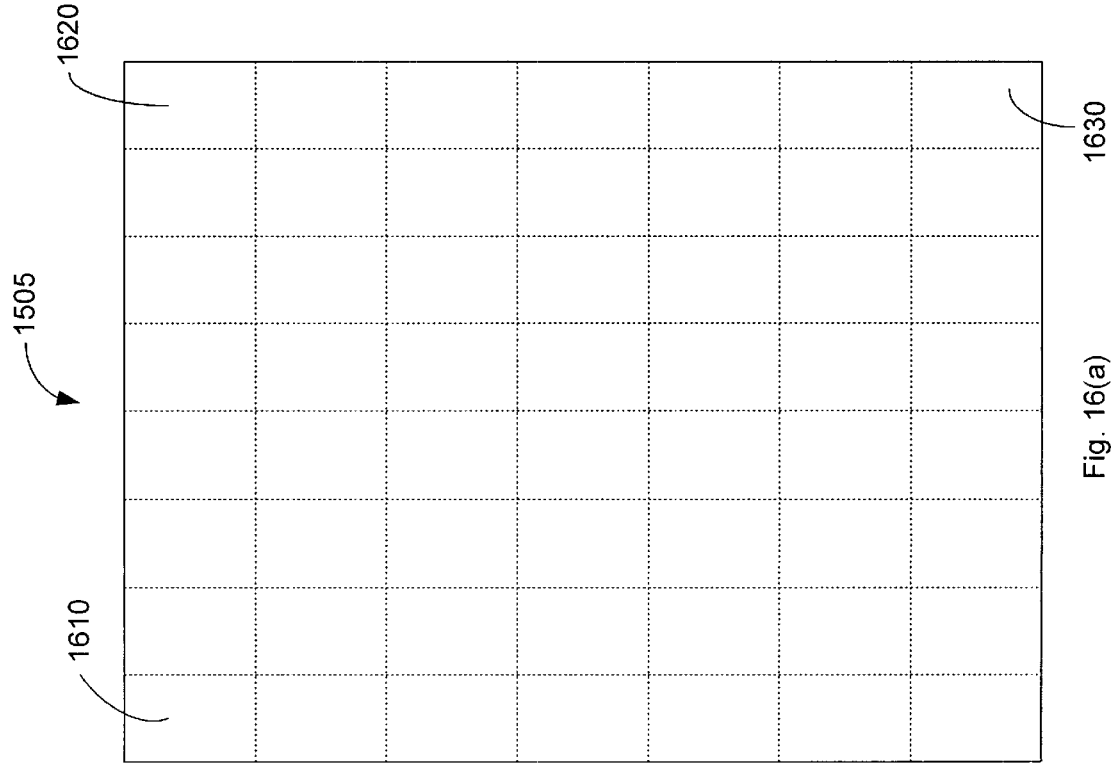
Fig. 16(b)
Fig. 16(a)

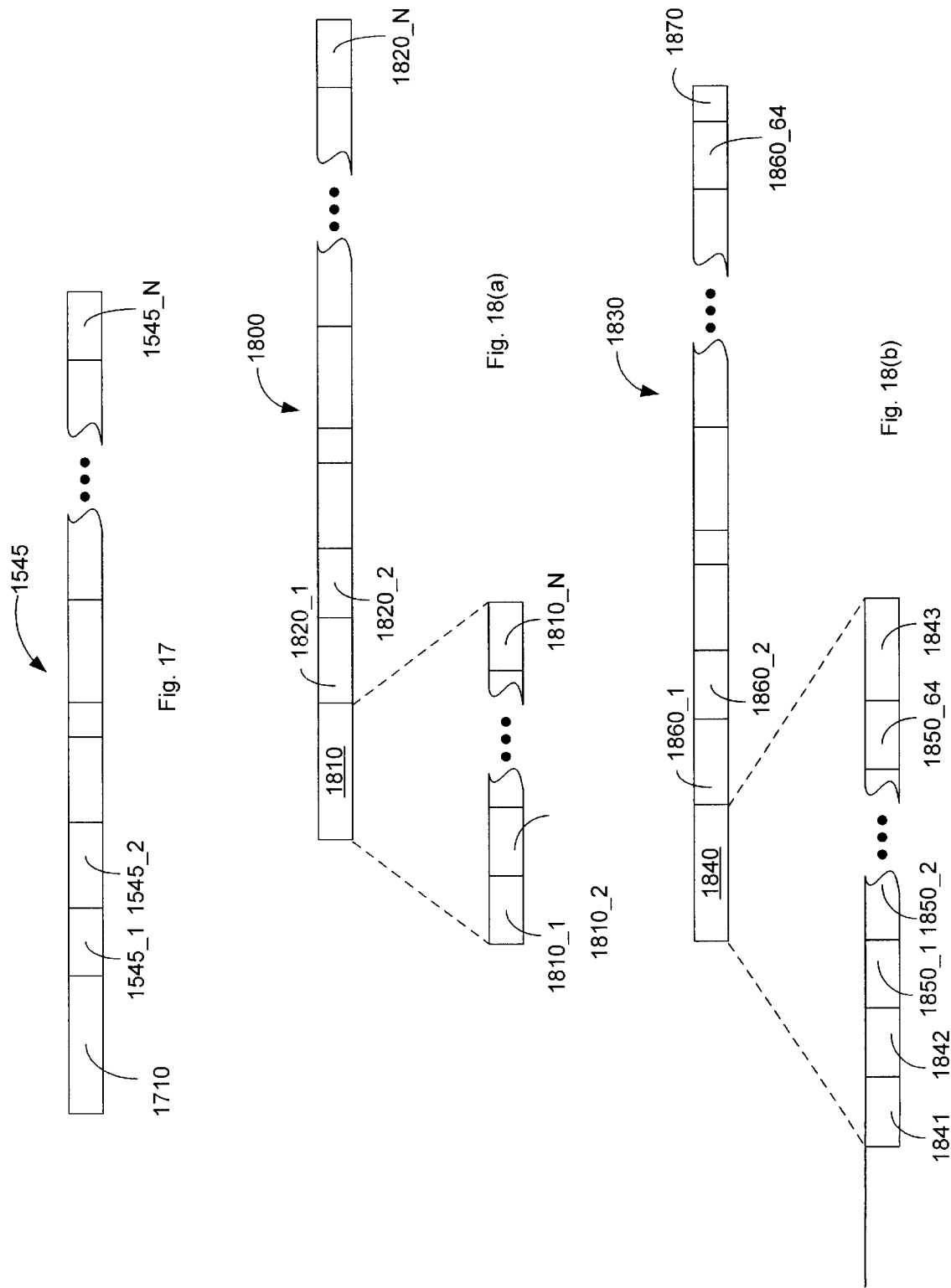

ENVIRONMENT MAP CREATION USING TEXTURE PROJECTIONS WITH POLYGONAL CURVED SURFACES

CROSS-REFERENCE TO RELATED APPLICATIONS

This application relates to concurrently filed, co-pending application Ser. No. 09505337, "POLYGONAL CURVATURE MAPPING TO INCREASE TEXTURE EFFICIENCY", by Hashimoto, et. al., owned by the assignee of this application and incorporated herein by reference.

This application relates to concurrently filed, co-pending application Ser. No. 09505442, "ENVIRONMENT DISPLAY USING TEXTURE PROJECTION WITH POLYGONAL CURVED SURFACES", by Hashimoto, et. al., owned by the assignee of this application and incorporated herein by reference.

This application relates to concurrently filed, co-pending application Ser. No. 09505334, "IMAGE COMPRESSION USING TILE DIVISION", by Hashimoto, et. al., owned by the assignee of this application and incorporated herein by reference.

This application relates to concurrently filed, co-pending application Ser. No. 09505352, "PARTIAL IMAGE DECOMPRESSION OF A TILED IMAGE", by Hashimoto, et. al., owned by the assignee of this application and incorporated herein by reference.

This application relates to concurrently filed, co-pending application Ser. No. 09505339, "DISPLAYING IMMERSIVE VIDEOS USING TILED DECOMPRESSION", by Hashimoto, et. al., owned by the assignee of this application and incorporated herein by reference.

CROSS-REFERENCE TO COMPUTER PROGRAM LISTING APPENDIX

A computer program listing appendix, incorporated herein by reference, is submitted as part of this disclosure. The computer program listing appendix is stored under the file name: "APPENDIX.TXT" residing on one compact disk.

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but other wise reserves all copyright rights whatsoever.

FIELD OF THE INVENTION

The present invention relates digital imaging. More specifically, the present invention relates to using texture mapping to create environmental projections for immersive video applications.

BACKGROUND OF THE INVENTION

Texture mapping is typically used to add realism to graphic images. Generally, texture mapping involves mapping a two dimensional image, typically referred to as the texture map, onto an object. The texture map contains color information for the object. The texture map is divided into a plurality of texture elements or texels. Texels typically provide color information for the object. The object is divided into a plurality of facets. Each facet is typically a polygon having one or more picture elements ("pixels"). The vertex of each facet is assigned a pair of texture coordinates which index the texture map to choose a texel (i.e., a color) from the texture map. The color of the facet is derived by interpolating between the colors and the vertices of the facet. Thus, the image of the texture map is reproduced onto the object.

At one time, the processing requirements of texture mapping limited texture mapping to professional graphic systems. However, as the processing power of microprocessors has increased, texture mapping software has become useable on consumer level computer systems. Furthermore, special graphics processing hardware capable of texture mapping has also become available for consumer level computer systems. Because texture mapping techniques have become feasible on consumer level computer systems, texture mapping techniques have been adapted for many different applications.

One use of texture mapping is environment mapping. Environment mapping uses computer graphics to display the surroundings or environment of a theoretical viewer. Ideally, a user of the environment mapping system can view the environment at any angle or elevation. FIG. 1 illustrates the construct used in conventional environment mapping systems. A viewer 105 (represented by an angle with a curve across the angle) is centered at the origin of a three dimensional space having x, y, and z coordinates. The environment of viewer 105 (i.e., what the viewer can see) is ideally represented by a sphere 110, which surrounds viewer 105. Generally, for ease of calculation, sphere 110 is defined with a radius of 1 and is centered at the origin of the three dimensional space. More specifically, the environment of viewer 105 is projected onto the inner surface of sphere 110. Viewer 105 has a view window 130 which defines the amount of sphere 110 viewer 105 can see at any given moment. View window 130 is typically displayed on a display unit for the user of the environment mapping system.

Conventional environment mapping systems include an environment capture system and an environment display system. The environment capture system creates an environment map which contains the necessary data to recreate the environment of viewer 105. The environment display system uses the environment map to display view window 130 (FIG. 1) to the user of the environment mapping system. Typically, the environment capture system and the environment display system are located in different places and used at different times. Thus, the environment map must be transported to the environment display system typically using a computer network, or stored in on a computer readable medium, such as a CD-ROM or DVD.

Computer graphic systems are generally not designed to process and display spherical surfaces. Thus, as illustrated in FIG. 2, texture mapping is used to create a texture projection of the inner surface of sphere 110 onto polygonal surfaces of a regular solid (i.e., a platonic solid) having sides that are tangent to sphere 110. Typically, as illustrated in FIG. 2, a texture projection in the shape of a cube 220 surrounds sphere 110. Specifically, the environment image on the inner surface of sphere 110 serves as a texture map which is texture mapped onto the inner surfaces of cube 220. A cube is typically used because most graphics systems are optimized to use rectangular displays and a cube provides six rectangular faces. Other regular solids (i.e., tetrahedrons, octahedrons, dodecahedrons, and icosahedrons) have non-rectangular faces. The faces of the cube can be concatenated together to form the environment map. During viewing, the portions of the environment map that correspond to view window 130 (FIG. 1 and FIG. 2) are displayed for viewer 105. Because, the environment map is. linear, texture coordinates can be interpolated across the face of each cube based on the vertex coordinates of the faces during display.

An extension to environment mapping is generating and displaying immersive videos. Immersive video involves creating multiple environment maps, ideally at a rate of 30 frames a second, and displaying appropriate sections of the multiple environment maps for viewer 105, also ideally at a rate of 30 frames a second. Immersive videos are used to provide a dynamic environment rather than a single static environment as provided by a single environment map. Alternatively, immersive video techniques allow the location of viewer 105 to be moved. For example, an immersive video can be made to capture a flight in the Grand Canyon. The user of an immersive video display system would be able to take the flight and look out at the Grand Canyon at any angle.

Difficulties with immersive video are typically caused by the vast amount of data required to create a high resolution environment map and the large number of environment maps required for immersive video. Specifically, transmission and storage of the environment maps for high resolution flicker-free display may be beyond the processing capabilities of most computer systems.

Conventional data compression techniques have been used to compress the environment maps and reduce the amount of data transmitted or stored for immersive video. However, the additional processing time required to decompress a compressed environment map may impair the ability of the environment display system to process an adequate number of environment maps to provide a flicker-free display. Thus, there is a need for a compression and decompression method for immersive videos that minimizes the processing time required for decompressing the environment map.

The excessive data problem for immersive video is compounded by the inefficiencies of the conventional texture projections used to form environment maps. Specifically, although a cubic texture projection can provide realistic environment views, the cubic texture projection is not very efficient, i.e., the average amount of environment information per area is relatively low. The inefficiency of the cubic projection is caused by the lack of symmetry between the amount of spherical area on sphere 110 mapped onto cube 220. For example, if each surface of cube 220 is subdivided into equal square areas as illustrated in FIG. 3., the square areas do not map to equal areas of sphere 110. For conciseness and clarity, only cube face 220_1 of cube 220 is discussed in detail because each cube face of cube 220 is typically processed in the same manner. Specifically, in FIG. 3, cube face 220_1 is divided into $N^2$ squares of equal area. More spherical area is mapped onto the squares near the center of a cube face than the squares near the edge of a cube face.

The inefficiency of the cubic texture projection is illustrated in FIG. 4. FIG. 4 uses a two dimensional mapping of a circle 410 onto a square 420. Specifically, a. quarter of circle 410 is mapped onto each side of square 420. arc segments 411–418 of circle 410 are mapped onto line segments 421–428 of square 420, respectively. Circle 410 is equivalent to sphere 110, square 420 is equivalent to cube 220, a side of square 420 is equivalent to a cube face of cube 220, each line segment of square 420 is equivalent to one of the square areas (FIG. 3) of cube 220, and each arc length of circle 410 is equivalent to the area of sphere 110 mapped on an area of cube 220. Like sphere 110, circle 410 has a radius of 1. Therefore, the arc length of an arc segment is equal to the angle of the arc segment in radians. Specifically, arc segment 414 has an arc length equal to angle A414 in radians. Angle A414 is equal to the inverse tangent of the length of facet 424 divided by the radius of circle 410. Thus, angle A414 and the arc length of arc segment 414 is equal to the inverse tangent of 0.25, which equals approximately 0.245. Angle A411 and the arc length of arc segment 411 are equal to the inverse tangent of 1 minus the inverse tangent of 0.75, which equals approximately 0.142. Thus, the mapping of circle 410 to square 420 results in inefficiencies due to the non-uniformity of the mapping.

Similarly, the mapping of sphere 110 onto cube 220 would result in mapping different amounts of spherical area of sphere 110 onto the equal areas of cube 220. For example, if a cube face is divided into 64 squares areas, a corner area would be mapped by only 0.0156 steradians (a measure of surface area) of sphere 120. However, a square area at the center of a cube face would be mapped by 0.0589 steradians of sphere 110. Thus, for the cubic texture projection, the area near the center of each face of cube 220 actually provides lower resolution than the square areas at the corners of each face. To provide the entire. environment of viewer 105 in a consistent resolution, a display system using the cubic texture projection must typically conform to the lowest resolution area of the projection. Thus, the higher resolution areas are not used optimally, leading to inefficiencies.

In general, the ideal texture projection for environmental mapping would use facets that represent identically sized areas of the sphere, as well as identically shaped areas of the sphere. Furthermore, an equal sized areas in each facet should map to equal sized areas of the sphere. Moreover, the facets of the ideal texture projection would collectively cover the entire environment of viewer 105. However, no practical texture projection can satisfy all these criteria. As explained above, a low number of facets results in very low resolution display of the environment map. Hence, there is a need for an efficient texture projection for use with environment mapping and immersive videos.

SUMMARY OF THE INVENTION

Accordingly, the present invention provides efficient texture mapping schemes and compression schemes for environment mapping and immersive videos. In accordance with one embodiment of the present invention, polygonal curved surfaces are used in place of polygons as the facets of a texture projection. Specifically, a texture projection generation unit forms a texture projection by dividing the environment into a plurality of initial polygonal curved surfaces. The initial polygonal curved surfaces are subdivided to form a plurality of second-generation polygonal curved surfaces. The second-generation polygonal curved surfaces are further divided to form a plurality of third-generation polygonal curved surfaces. Division of polygonal curved surfaces continues until a plurality of last-generation polygonal curved surfaces is created. Each last-generation polygonal curved surface becomes a facet of the texture projection. Various division methods can be used to divide a polygonal curved surface. In accordance with one embodiment of the present invention, each polygonal curve of a specific generation has an equal area.

An environment map creation system uses the texture projection formed by polygonal curved surfaces to create an environment map. The environment map creation system includes an environment capture/generation unit that provides one or more images that captures the environment of a user. A corresponding image area on the one or more images is determined for each facet of the texture projection. Each facet is colored based on the corresponding image area. Each initial polygonal curved surface of the texture projection is converted into a two-dimensional polygonal image. The last-generation polygonal curved surfaces becomes pixels or texels of the two-dimensional image. The two-dimensional images are concatenated together to form the environment map.

A compression unit is used to compress the environment map and create a compressed environment map. Specifically, a compression unit in accordance with one embodiment of the present invention divides the environment map into a plurality of tiles. Each tile is compressed by a tile compressor independently of the other tiles to form a compressed tile. The sizes of the compressed tiles is used to create a header for the compressed environment map. In one embodiment of the present invention, the header contains an offset value for each compressed tile. The offset value provides the starting location of a compressed tile within the compressed environment map.

A decompression unit is then used to decompress a subset of relevant tiles of the environment map. The subset of relevant tiles includes all tiles which contain data needed to texture map a view window. The subset of relevant tiles may also include some tiles which do not have data needed to texture map the view window. Because only a portion of the tiles are actually decompressed, decompression units in accordance with the present invention requires less processing time than conventional decompression units.

After decompression of the subset of relevant tiles, an environment display system uses the newly formed decompressed environment map to texture map the view window. Specifically, the environment display system uses a texture projection having polygonal curved surfaces as an object to be texturized using the decompressed environment map. In some embodiments of the present invention, the polygonal curved surfaces are triangularized to take advantage of conventional hardware rendering units. By using an efficient texture projection with tiled compression and partial decompression, the environment maps created by embodiments of the present invention are ideally suited for immersive video applications.

The present invention will be more fully understood in view of the following description and drawings.

BRIEF DESCRIPTION OF THE DRAWINGS

FIGS. 16(a)–(b) are diagrams of images (e.g., environment maps) divided into tiles in accordance with one embodiment of the present invention.

FIG. 17 is an illustration of a compressed image in accordance with one embodiment of the present invention.

FIGS. 18(a)–18(b) are illustrations of compressed images in accordance with two embodiments of the present invention.

DETAILED DESCRIPTION

Figure 1:
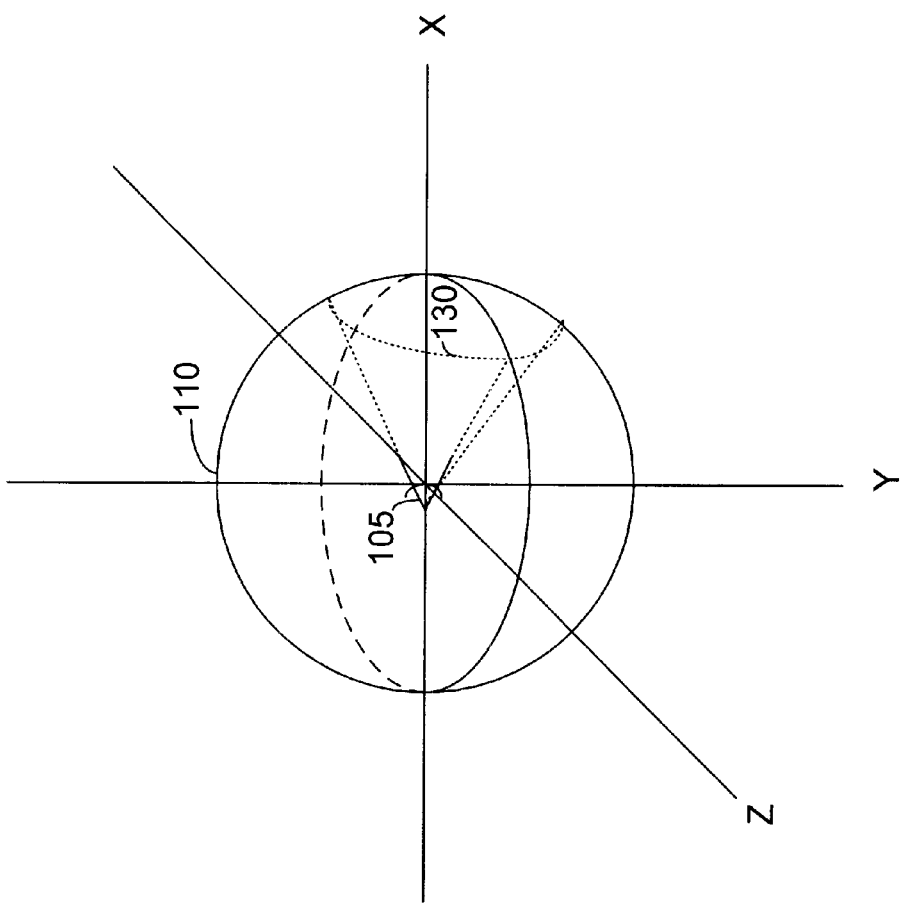
FIG. 1 is a three-dimensional representation of a user and an environment.

As explained above, environment mapping typically represents the environment around a user using a sphere. Specifically, the user's view of the environment is represented as a texture map on the inside surface of the sphere. The environment is texture mapped onto the inside surfaces of a solid. Typically, a texture projection is formed by dividing the inner surfaces of the solid into polygonal facets. However, as explained above, conventional texture projections are inefficient as compared to an ideal texture projection. Furthermore, ideal texture projections are impractical because ideal texture projections can use only a limited number of facets.

The present invention provides texture projections which provide greater efficiency than conventional texture projections by using facets that nearly satisfy the criteria of the facets of an ideal texture projection. Specifically, the facets used in the present invention are polygonal curved surfaces rather than polygons. Polygonal curved surfaces can be thought of as polygons wrapped onto a base curved surface, e.g. a sphere, a cylinder, or a cone. Specifically, an N-sided polygonal curved surface has N consecutive sides (S[0]–S[N-1]) which join N consecutive vertices (V[0]–V[N-1]), each of which is located on the base curved surface. Specifically, each side S[j] joins vertex V[j] to vertex V[j+1 Mod N], where j is an integer from 0 to N-1. The sides of a polygonal curved surface follow the shortest path along the base curved surface between the consecutive vertices. The surface of the polygonal curved surface is congruent to the surface of the base curved surface between the sides of the polygonal curved surface. For convenience, standard mathematical prefixes are used herein to describe specific polygonal curved surfaces. For example, a tetragonal curved surface has four vertices and four sides. Similarly, a pentagonal curved surface has five vertices and five sides. However, a polygonal curved surface having 3 sides and 3 vertices is referred to as a triangular curved surface in the same manner as a 3 sided polygon is referred to as a triangle rather than a "trigon."

In accordance to one embodiment of the present invention, a texture projection uses polygonal curved surfaces as facets to surround a user. The vertices of the polygonal curved surfaces can be derived recursively from a plurality of initial polygonal curved surfaces. The initial polygonal curved surfaces should encompass the desired environment of viewer 105 (see FIG. 1). Then, each initial polygonal curved surface is subdivided into additional polygonal curved surfaces. The polygonal curved surfaces formed by dividing the initial polygonal curved surfaces are referred to as second-generation polygonal curved surfaces. Then, each second-generation polygonal curved surface is divided into additional polygonal curved surfaces to form a plurality of third-generation polygonal curved surfaces. The process of recursively dividing polygonal curved surfaces into more polygonal curved surfaces continues until a desired number of facets is reached. The polygonal curved surfaces forming the facets of the texture projection are referred to as last-generation polygonal curved surfaces. As the number of facets increases, the facets become smaller and more planar and thus can be texture mapped using conventional techniques. For clarity, initial polygonal curved surfaces are referred to by a reference number R. As polygonal curved surface R is divided into a plurality of second-generation polygonal curved surfaces, each second-generation polygonal curved surface is referred to in the form R(x) where x is an integer. Additional parenthesis and indices are added as each new generation of polygonal curved surface is formed.

Division of a polygonal curved surface into a plurality of next-generation polygonal curved surfaces can be performed in many ways. In accordance with one embodiment of the present invention, a polygonal curved surface is divided into a plurality next-generation polygonal curved surfaces so that adjacent polygonal curved surfaces share a common side and two common vertices. FIGS. 5(*a*)–5(*e*) illustrate a texture projection recursively derived in accordance with one embodiment of the present invention. Specifically,in FIG. 5(*a*), six initial tetragonal curved surfaces 510, 520, 530, 540, 550, and 560 (not visible) are formed around a spherical base curved surface equivalent to sphere 110. Table 1 (below) provides the vertices of the initial tetragonal curved surfaces of FIG. 5(*a*) assuming the polygonal curved surfaces are centered on the origin of a 3-D space in which the positive x-coordinate points towards the right side of the page, the positive y-coordinate points toward the top of the page, and the positive z-coordinate points into the page. In Table 1, "b" is equal to the square root of one-third (approximately 0.57735).

TABLE 1

| Curve | Vertex 1 | Vertex 2 | Vertex 3 | Vertex 4 |
| --- | --- | --- | --- | --- |
| 510 | (−b, −b, −b) | (b, −b, −b) | (b, b, −b) | (−b, b, −b) |
| 520 | (−b, b, b) | (b, b, b) | (b, b, −b) | (−b, b, −b) |
| 530 | (b, −b, b) | (b, −b, −b) | (b, b, −b) | (b, b, b) |
| 540 | (−b, −b, −b) | (b, −b, −b) | (b, −b, b) | (−b, −b, b) |
| 550 | (−b, −b, −b) | (−b, −b, b) | (−b, b, b) | (−b, b, −b) |
| 560 | (−b, −b, b) | (b, −b, b) | (b, b, b) | (−b, b, b) |

Because initial tetragonal curved surfaces 510–560 have the same area and shape, only division of initial tetragonal curved surface 510, having sides 511, 512, 513 and 514, is shown and explained in detail. Specifically, in FIG. 5(*b*), initial tetragonal curved surface 510 is divided into two second-generation tetragonal curved surfaces 510(1) and 510(2). Shared side 515 of second-generation tetragonal curved surfaces 510(1) and 510(2) is formed by connecting the midpoints of two opposite sides of tetragonal curved surface 510. Specifically, in FIG. 5(*b*) shared side 515 connects the midpoints of side 511 and side 513. Thus, each second-generation tetragonal curved surface has a first vertex at the midpoint of a first side of the initial tetragonal curved surface, a second vertex at the midpoint of a second side of the initial tetragonal curved surface, a third vertex equal to a first vertex of the initial tetragonal curved surface, and a fourth vertex equal to a second vertex of the initial tetragonal curved surface. In FIG. 5(*c*) second-generation tetragonal curved surface 510(1) is divided into two third-generation tetragonal curved surfaces 510(1)(1) and 510(1)(2) by a shared side 516 joining the midpoints of side 514 and shared side 515. Similarly, second-generation tetragonal curved surface 510(2) is divided into two third-generation tetragonal curved surfaces 510(2)(1) and 510(2)(2) by a shared side 517 joining the midpoints of side 512 and shared side 515. Table 2 provides the vertices of third-generation tetragonal curved surfaces 510(1)(1), 510(1)(2), 510(2)(1), and 510(2)(2) using the same coordinate system as Table 1. In Table 2 "b" is equal to the square root of one-third and "c" is equal to the square root of one-half.

TABLE 2

| Curve | Vertex 1 | Vertex 2 | Vertex 3 | Vertex 4 |
| --- | --- | --- | --- | --- |
| 510 (1) (1) | (0, c, −c) | (−b, b, −b) | (−c, −0, −c) | (0, 0, −1) |
| 510 (2) (1) | (c, 0, −c) | (0, 0, −1) | (0, −c, −c) | (b, −b, −b) |
| 510 (1) (2) | (0, 0, −1) | (−c, 0, −c) | (−b, −b, −b) | (0, −c, −c) |
| 510 (2) (2) | (b, b, −b) | (0, c, −c) | (0, 0, −1) | (c, 0, −c) |

As illustrated in FIG. 5(*d*), third-generation tetragonal curved surfaces 510(1)(1), 510(2)(1), 510(1)(2), and 510(2)(2) can be further divided into fourth generation tetragonal curved surfaces, 510(1)(1)(1) and 510(1)(1)(2), 510(2)(1)(1) and 510(2)(1)(2), 510(1)(2)(1) and 510(1)(2)(2), 510(2)(2)(1) and 510(2)(2)(2), respectively, by connecting the midpoints of opposite sides. Additional generations of polygonal curved surfaces can be derived similarly until a desired number of facets is reached. One benefit of connecting midpoints of opposite sides is that each polygonal curved surface shares common sides with neighboring polygonal curved surfaces. Vertex coordinates for additional generations of polygonal curved surfaces can be obtained using the software program included in the computer program listing appendix.

Figure 6B:
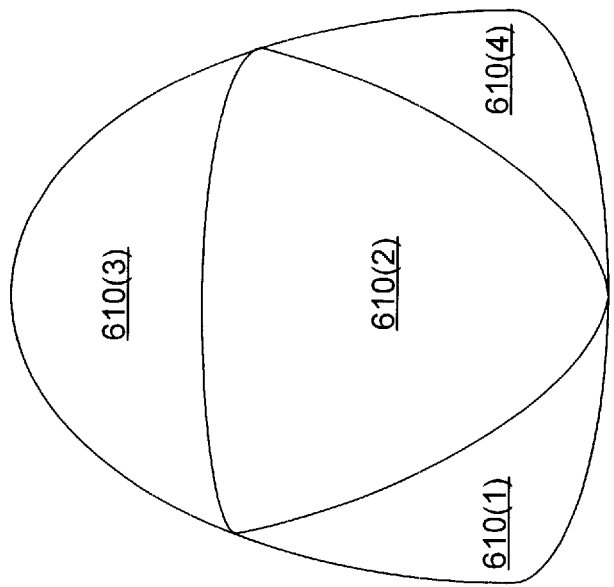
FIGS. 6(a)–6(b) are illustrations of the division of triangular curves.
Figure 6A:
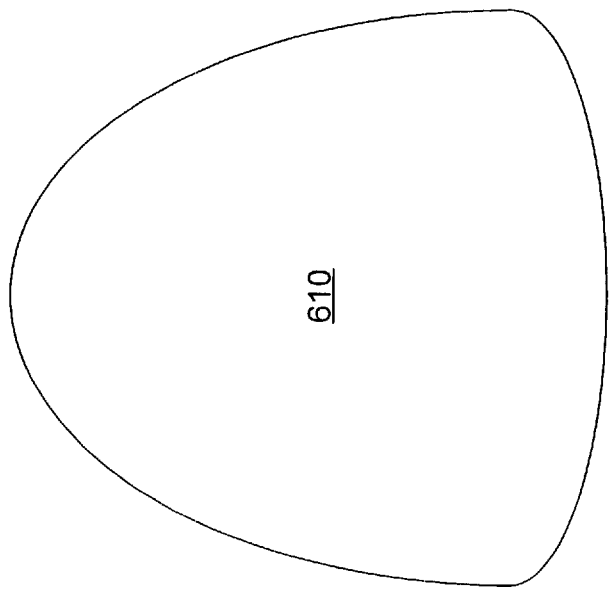

FIGS. 6(*a*)–6(*b*) illustrate an embodiment of the present invention using triangular curved surfaces. Triangular curved surfaces of the same area and shape can be used to form a sphere in many ways. Specifically, 4, 8, or 20 triangular curves can be used to form a sphere corresponding to a tetrahedron, octahedron, and icosahedron, respectively. For brevity and clarity, FIGS. 6(*a*)–6(*b*) show the division of a single initial triangular curved surface 610 into four second generation triangular curved surfaces 610(1), 610(2), 610 (3), and 610(4). Specifically, as illustrated in FIG. 6(*b*), the sides second generation triangular curved surface 610(2) is formed by connecting the midpoints of the sides of triangular curved surface 610. Additional generations of triangular curved surfaces can be generated similarly.

As explained above, one condition for an ideal texture projection is that each facet represents an equal amount of area on sphere 110. Thus, in accordance with another embodiment of the present invention, division of a polygonal curved surface creates a plurality of next-generation polygonal curved surfaces having equal areas. FIGS. 7(*a*)

Figure 7B:
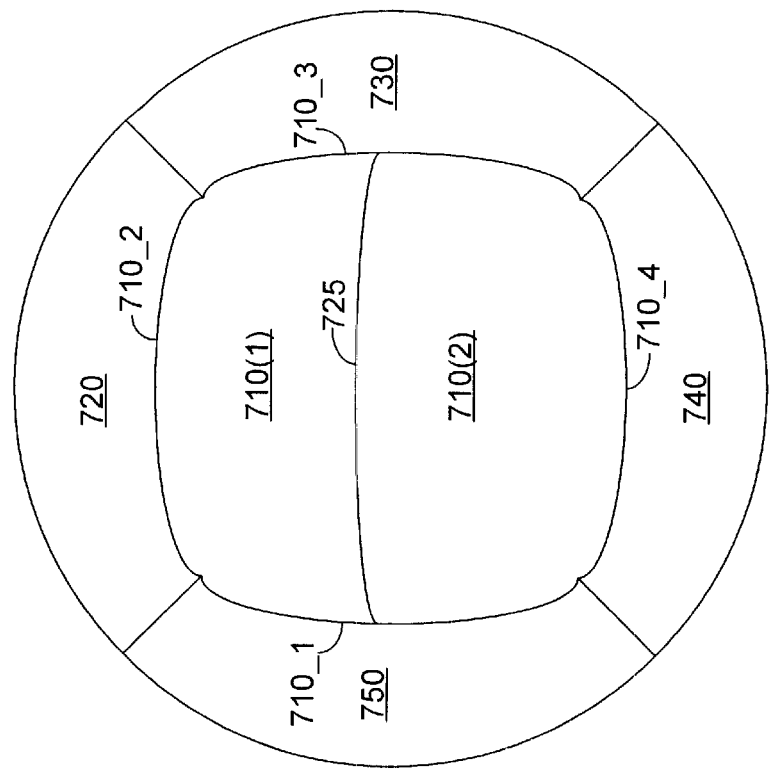
FIGS. 7(a)–7(c) are three-dimensional representations of a sphere with polygonal curved surfaces as facets.
Figure 7A:
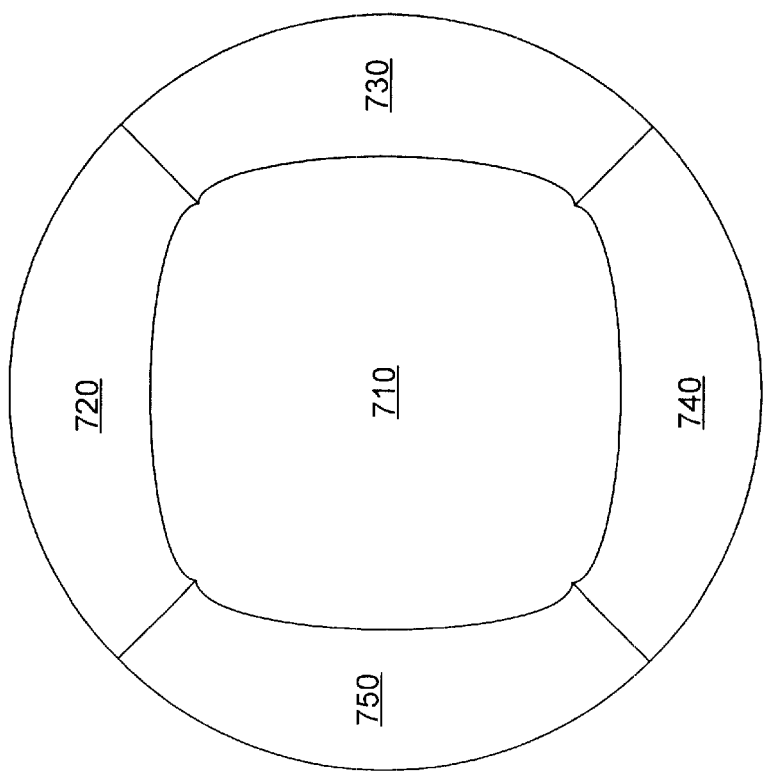

−7(c) illustrate an embodiment of the present invention for deriving a texture projection using tetragonal curved surfaces having equal areas. As illustrated in FIG. 7(a), six initial tetragonal curved surfaces 710, 720, 730, 740, 750 and 760 (not visible) are formed around a spherical base curve equivalent to sphere 110. Initial tetragonal curved surfaces 710–760 are equivalent to initial tetragonal curved surfaces 510–560 of FIG. 5(a) and Table 1. Because initial tetragonal curved surfaces 710–760 are the same area and shape, only division of initial tetragonal curved surface 710 is shown and explained in detail. In FIG. 7(b), initial tetragonal curved surface 710 is divided into two second-generation tetragonal curved surfaces 710(1) and 710(2) have the same area. Specifically, two opposite sides (sides 710_1 and 710_3) of initial tetragonal curved surface 710 are selected. In accordance with one embodiment of the present invention, shared side 725 of tetragonal curved surface 710(1) and 710(2) is defined by placing a first vertex of shared side 725 at the coordinates of a vertex of side 710_1 and a second vertex of shared side 725 at the coordinates of a vertex of side 710_3. The first and second vertices are shifted along sides 710_1 and 710_3, respectively, until second-generation tetragonal curved surfaces 710(1) and 710(2) have the same area. The speed at which the vertices are shifted along sides 710_1 and 710_3 is directly proportional to the length of the side. Thus, for example, if side 710_1 is twice as long as side 710_2, the first vertex of shared side 725 is shifted twice as quickly as the second vertex of shared side 725.

Figure 5B:
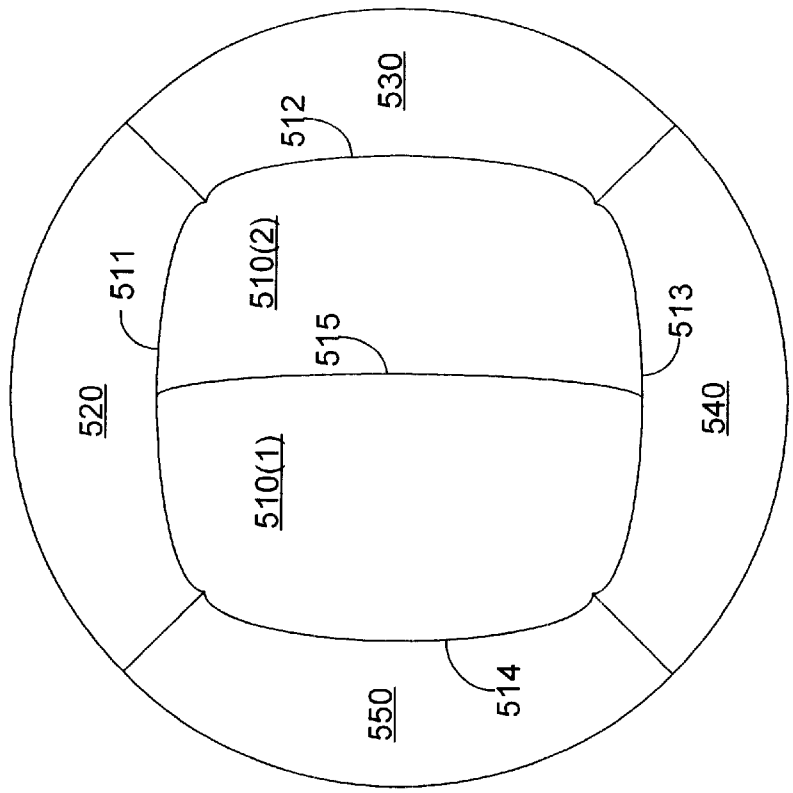
FIGS. 5(a)–5(d) are three-dimensional representations of a sphere with polygonal curved surfaces as facets.
Figure 5A:
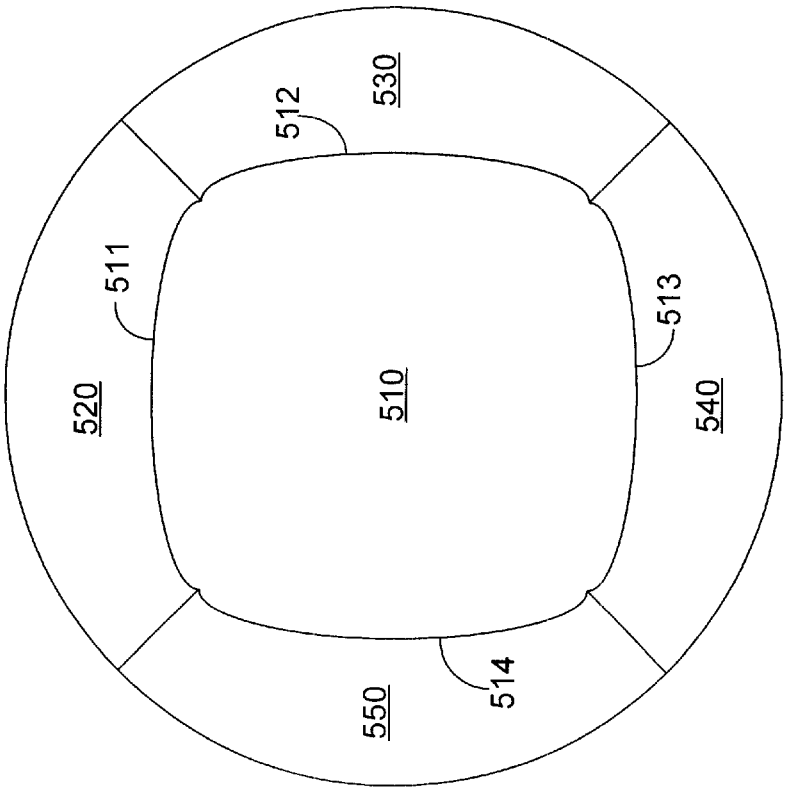
Figure 5D:
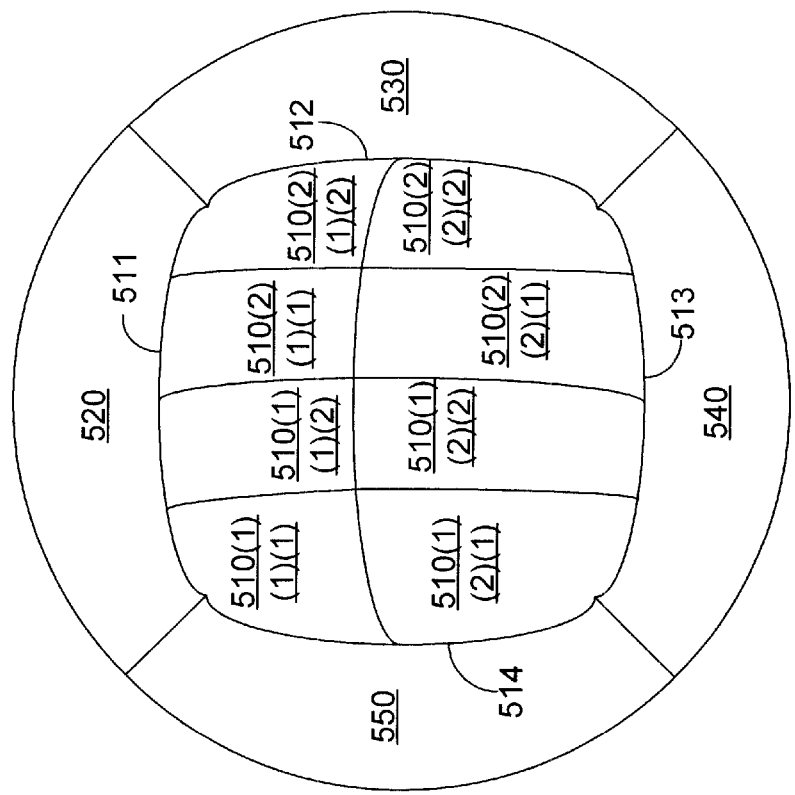
Figure 5C:
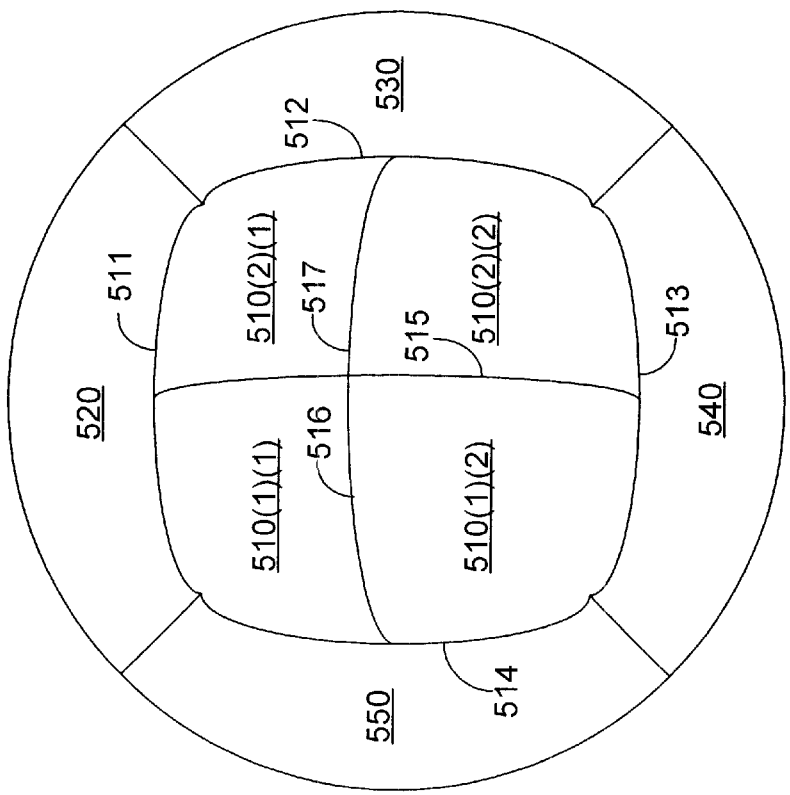
Figure 7C:
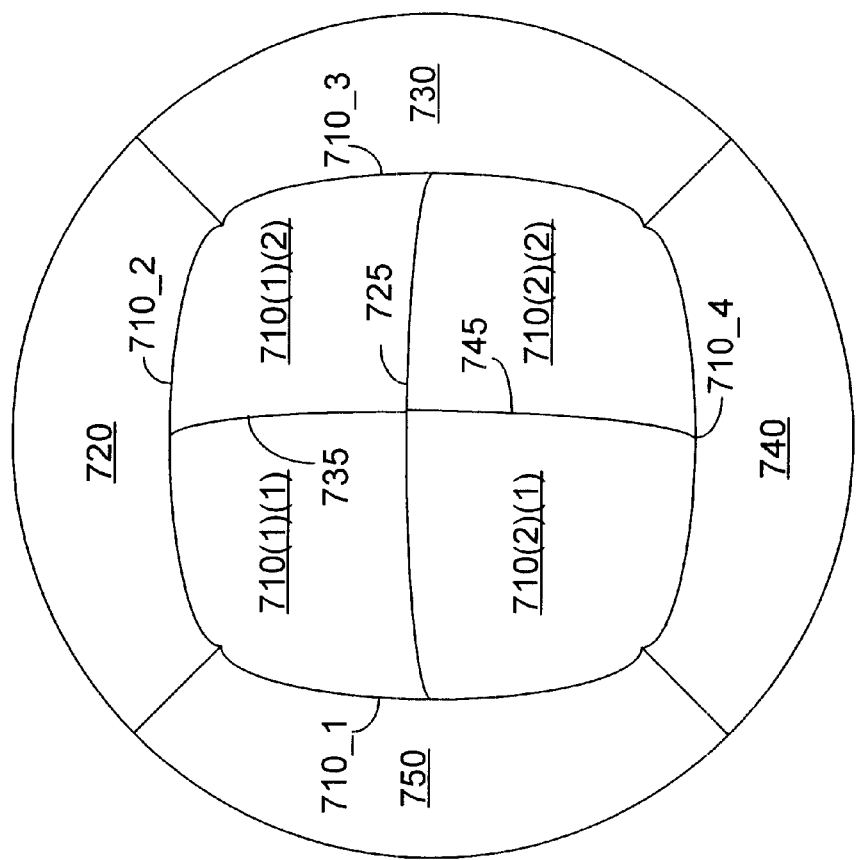

As shown in FIG. 7(c), second-generation tetragonal curved surfaces 710(1) is then subdivided into third-generation tetragonal curved surfaces 710(1)(1) and 710(1)(2) by a shared side 735. Shared side 735 is selected by spanning shared side 725 and side 710_3 to cause third-generation tetragonal curved surfaces 710(1)(1) and 710(1)(2) to have the same area. Similarly, second-generation tetragonal curved surface 710(2) is divided by shared side 745 to form third generation tetragonal curved surfaces 710(2)(1) and 710(2)(2) having the same area. Additional generations of tetragonal curved surfaces are formed similarly until a desired number of facets is reached. The vertices for third-generation tetragonal curved surfaces 710(1)(1), 710(1)(2), 710(2)(2), and 710(2)(1) are the same as for second-generation tetragonal curved surfaces 510(1)(1), 510(2)(1), 510(2)(2), and 510(1) (2), respectively. However division of third-generation tetragonal curved surface 710(1)(1), as described with the method of FIGS. 7(a)–7(c), will result in polygonal curved surfaces that are not equivalent to the division of third-generation tetragonal curved surface 510(1)(1), as illustrated in FIG. 5(d). Vertex coordinates for additional generations of polygonal curved surfaces can be obtained using the software program included in the computer program listing appendix.

Figure 8B:
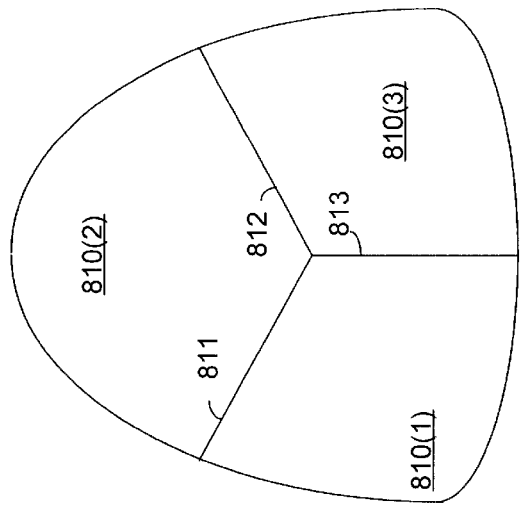
FIGS. 8(a)–8(c) are illustrations of the division of triangular curves.
Figure 8C:
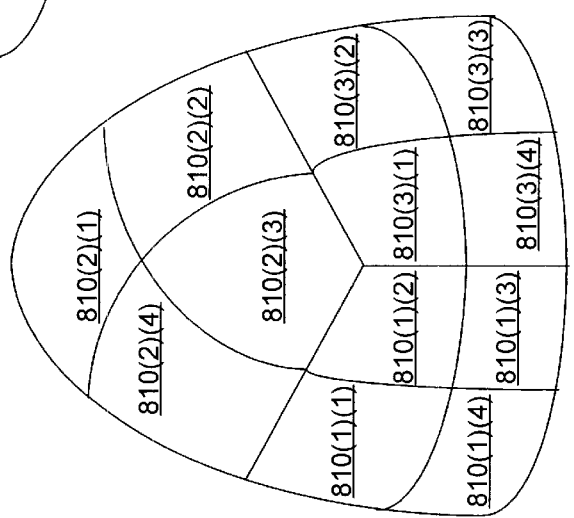
Figure 8A:
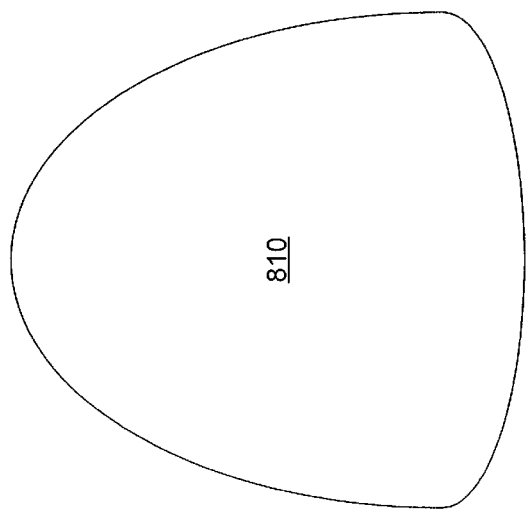

In accordance with some embodiments of the present invention, multiple methods to divide the polygonal curved surfaces may be used to form a single texture projection. Furthermore, polygonal curved surfaces may be divided into next-generation polygonal curved surfaces having a different number of sides. For example, as illustrated in FIGS. 8(a), 8(b) and 8(c), one embodiment of the present invention divides an initial triangular curved surface 810 into three second-generation tetragonal curved surfaces 810(1), 810 (2), and 810(3). Initial triangular curved surface 810 is divided by forming shared sides 811, 812, and 813 from the midpoints of the sides of initial triangular curve 810 to the center of initial triangular curved surface 810. As shown in FIG. 8(c), second-generation tetragonal curved surfaces 810(1), 810(2), and 810(3) can then be subdivided into third-generation tetragonal curved surfaces 810(1)(1)–810 (1)(4), 810(2)(1)–810(2)(4), and 810(3)(1)–810(3)(4), respectively, using the method illustrated in FIGS. 5(a)–5(c) or FIGS. 7(a)–7(c).

Figure 9:
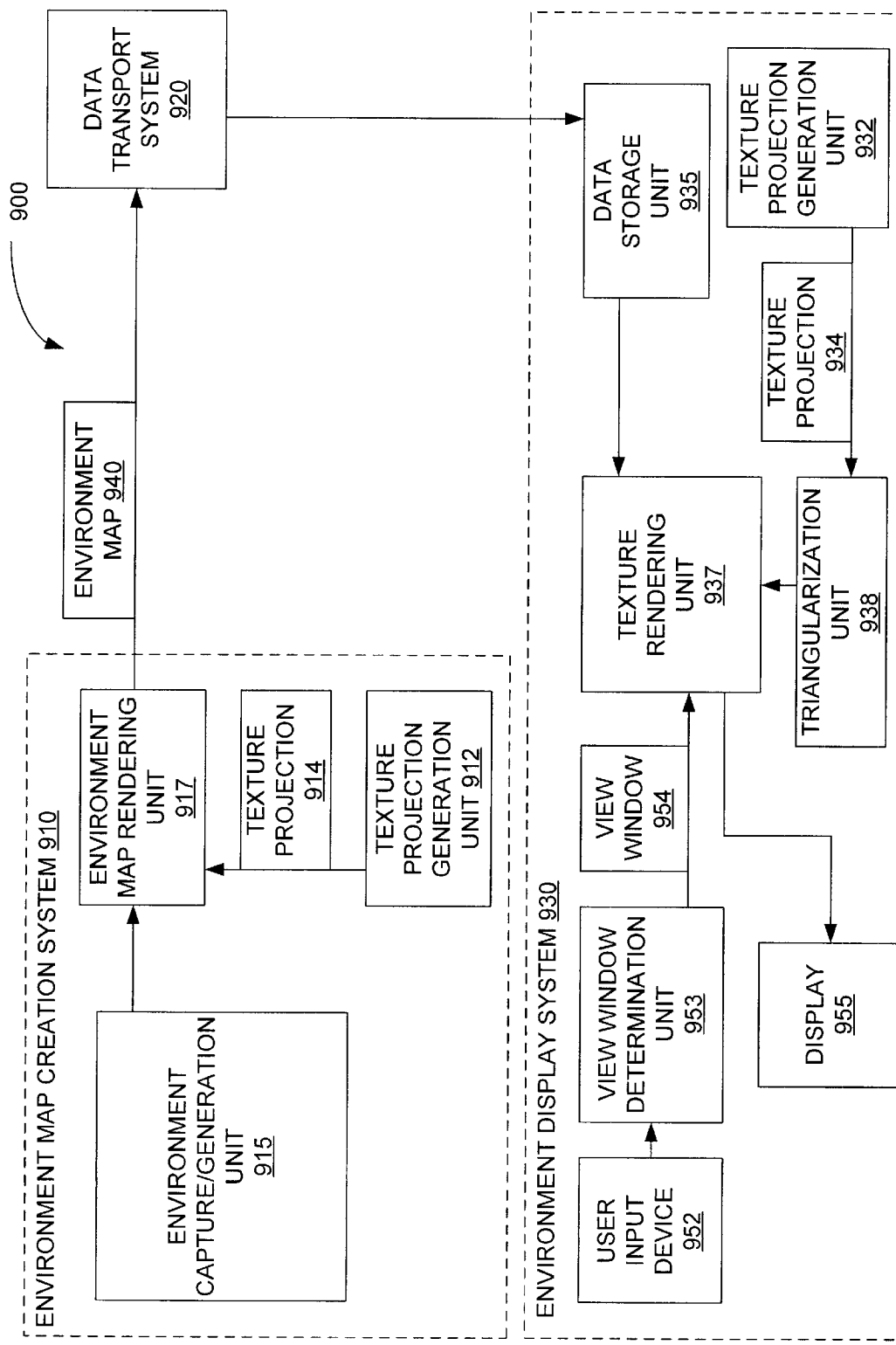
FIG. 9 is a block diagram of an environment capture and display system.

FIG. 9 shows an environment capture and display system 900 having an environment map creation system 910, a data transport system 920, and an environment display system 930. Environment map creation system 910 creates an environment map 940 for the environment of viewer 105, i.e., the inner surface of sphere 110 (FIG. 1). Specifically an environment capture/generation unit 915 captures or generates one or more images to represent the environment of viewer 105. For example, in some systems environment capture/generation unit 915 contains a camera system which can capture the entire environment of viewer 105. Some embodiments of environment capture/generation unit 915 use multiple cameras to take multiple pictures at various angles centered around viewer 105. A multiple camera system typically provides very high resolution images, but also includes redundant data due to overlapping views from the cameras. In other embodiments, environment capture/generation unit 915 generates an artificial environment for viewer 105. The generated environment can be stored as a single image or multiple images at varying resolution.

Figure 2:
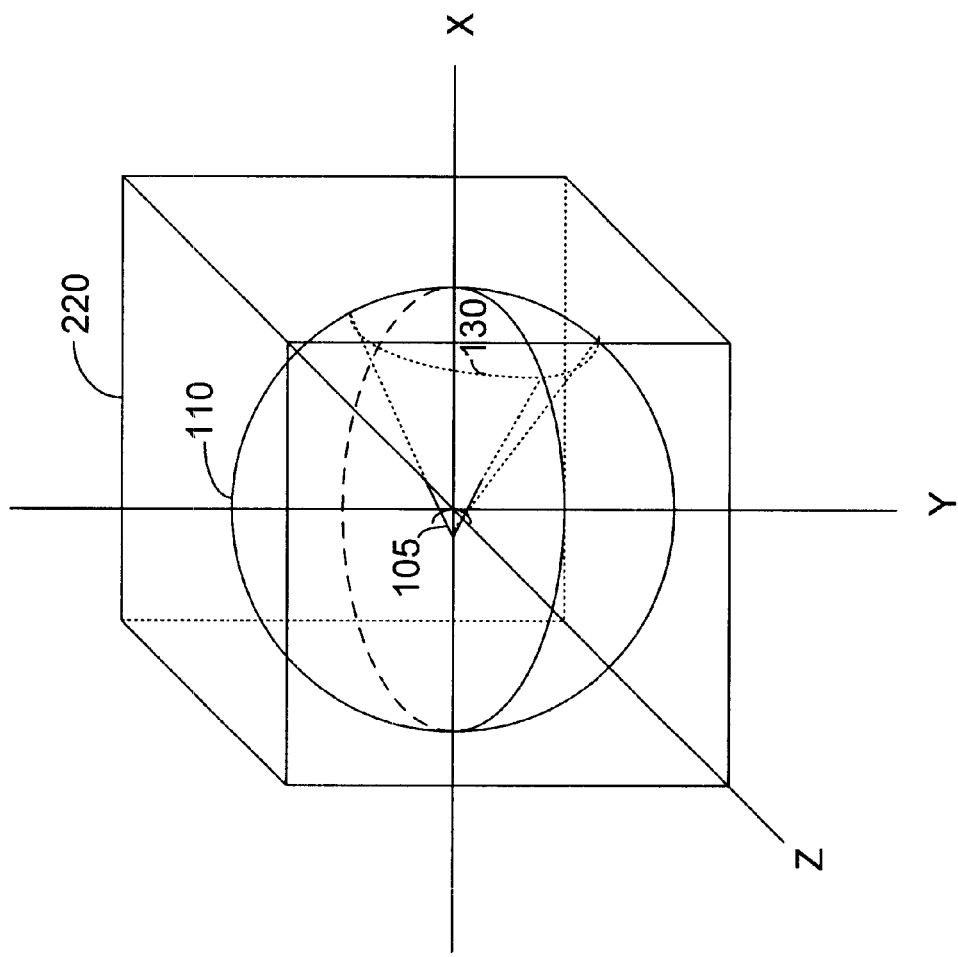
FIG. 2 is a three-dimensional representation for texture mapping a spherical environment on a cube.
Figure 3:
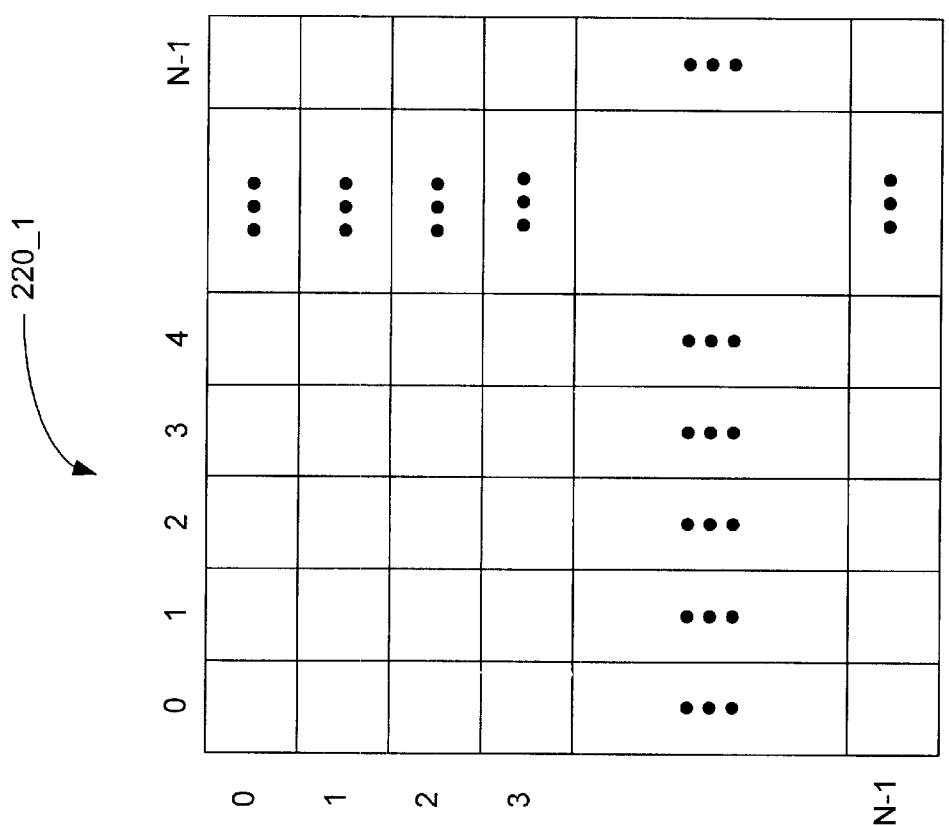
FIG. 3 is an illustration of a cube face divided into facets.
Figure 4:
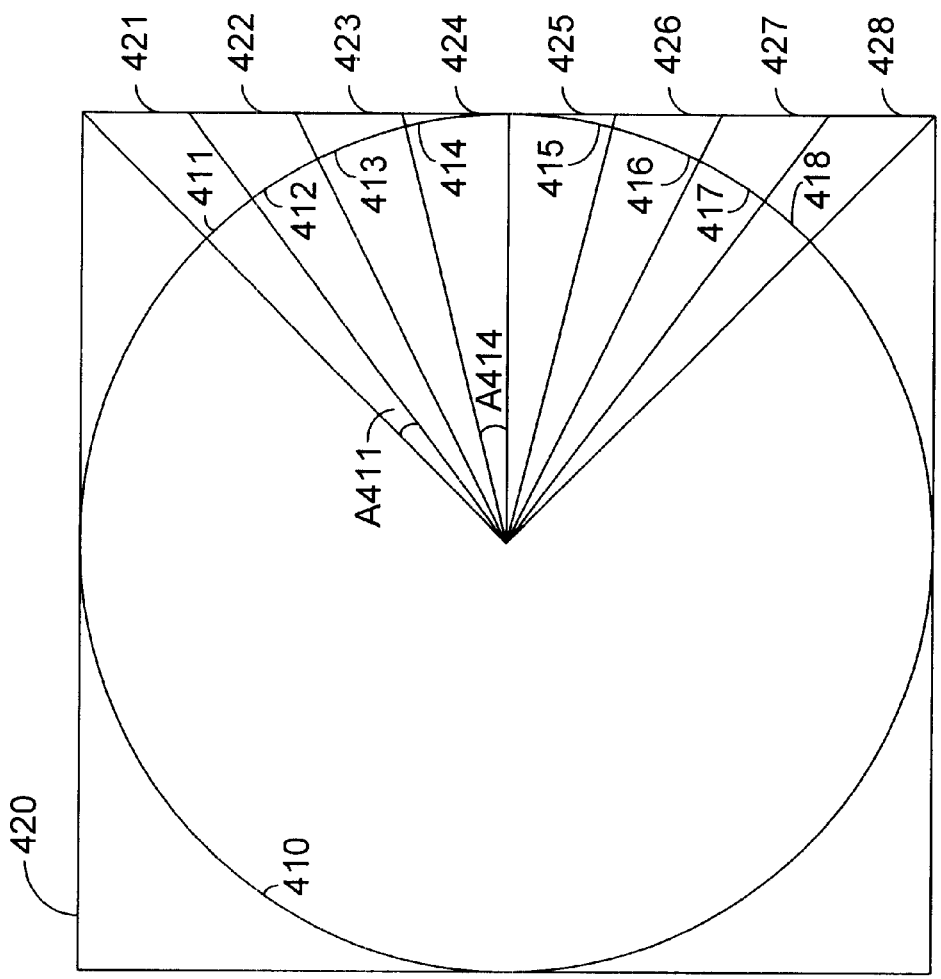
FIG. 4 is a two-dimensional representation for texture mapping a circle onto a square.

Next environment data is passed to environment map rendering unit 917. Environment map rendering unit 917 also receives a texture projection 914 from texture projection generation unit 912. The number of facets of texture projection 914 is usually chosen to equal the desired resolution of environment map 940. Conceptually, environment map rendering unit 917 forms an environmental surface surrounding viewer 105 from the one or more images supplied by environment capture/generation unit 915. Conventional image stitching techniques can be used to join multiple images. For example, if environment capture/generation unit 915 is a six-camera system, environment map rendering unit 917 conceptually forms a cube (such as cube 220 in FIG. 2) around viewer 105 using six images from environment capture/generation unit 915.

Then, environment map rendering unit 917 determines the area on the environmental surface corresponding to each of the facets in texture projection 914. Conceptually, the corresponding area is determined by forming a solid angle encompassing the texture and projecting the solid angle onto the environmental surface. The corresponding area is the area of the environmental surface intersecting the solid angle. As stated above, typically the number of facets is selected to equal the desired resolution of the environment map. Thus, each facet corresponds to one texel on the environment map. Accordingly, the facet has a single color that is determined by averaging the colors of the pixels in the corresponding area on the environmental surface. However, in some embodiments of the present invention, a facet corresponds to multiple pixels on the environment map. For these embodiment the facet has multiple colors based on the corresponding area of the environmental surface.

In actual implementation, environment map rendering unit 917 can determine the image and area in that image which corresponds to each facet based on the camera system configuration. Some facets may correspond to multiple images, e.g., a facet which projects onto the intersection of one or more images. The color for these facets can either be determined by using only one image, or by averaging the appropriate area of each image.

Figure 10B:
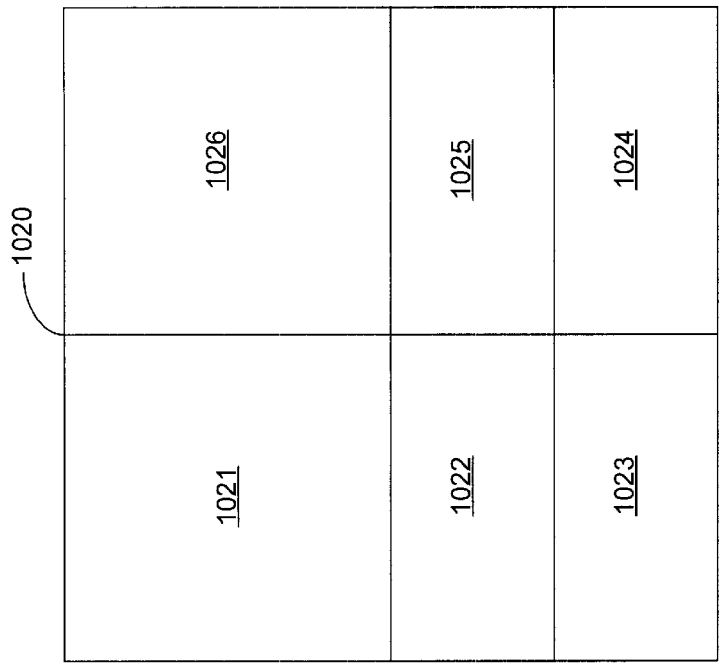
FIGS. 10(a)–10(b) are environment maps in accordance with embodiments of the present invention.
Figure 10A:
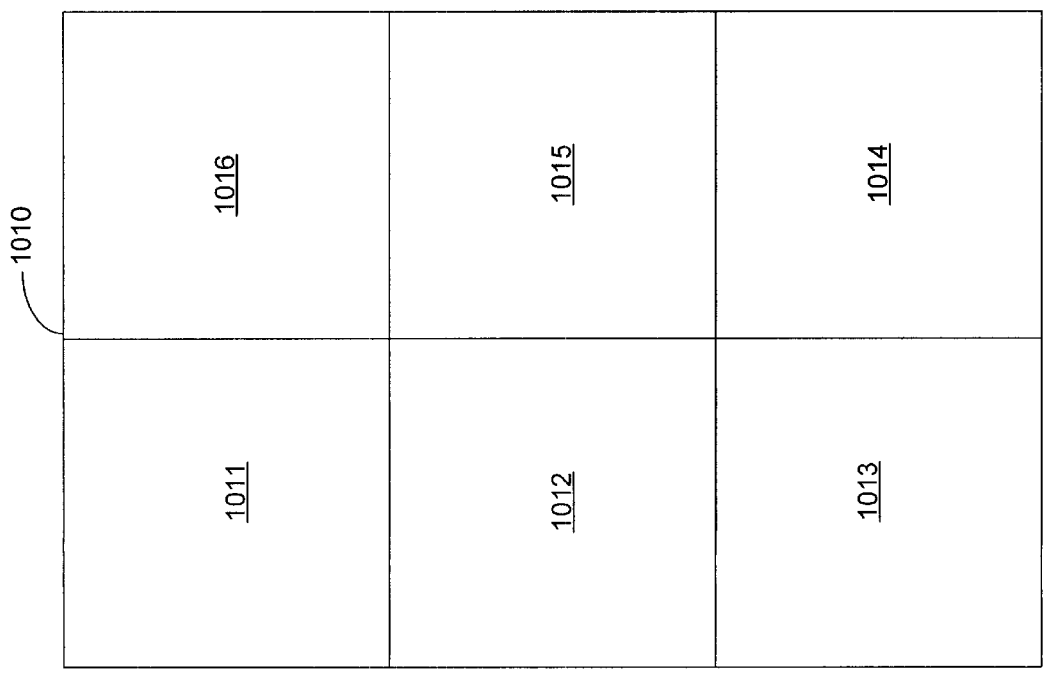

Once the color or colors of each facet is determined, environment map rendering unit 917 generates environment map 940 by treating each initial polygonal curved surface of the texture projection as a two-dimensional polygonal image. Each facet within an initial polygonal curved surface becomes a texel in the corresponding two-dimensional polygonal image. The two-dimensional polygonal images are then concatenated together to form environment map 940. For example, FIG. 10(a) shows an environment map 1010 that could be formed using a texture projection based on FIGS. 5(a)–5(d). Specifically, initial tetragonal curved surfaces 510, 520, 530, 540, 550, and 560, are converted into two-dimensional tetragonal images 1011, 1012, 1013, 1014, 1015, and 1016, respectively. Two-dimensional tetragonal images 1011–1016 are concatenated together to form environmental map 1010. In some embodiments of the present invention, square environmental maps are desired. For these embodiments, the two-dimensional tetragonal images may have different resolutions. For example, in FIG. 10(b), an environmental map 1020 having a resolution of 1024×1024 is formed by two-dimensional tetragonal images 1021, 1022, 1023, 1024, 1025, and 1026. Two-dimensional tetragonal images 1021 and 1025 have a resolution of 512×512. Two-dimensional tetragonal images 1022–1025 have a resolution of 512×256. Two-dimensional tetragonal images 1022–1025 may be formed by forming a 512×512 image and reducing it to 512×256 using conventional techniques. Alternatively, initial polygonal curved surfaces corresponding to two-dimensional tetragonal images 1022–1025 may have 512×256 facets.

After environment map creation system 910 (FIG. 9) creates environment map 940, environment map 940 is transported to environment display system 930 by data transport system 920. In some embodiments of the present invention, data transport system 920 is a data channel, such as a local area network, a telephone line, or the internet. In other embodiments of the present invention, data transport system 920 is a storage medium, such as a CD-ROM, a DVD, or a data tape.

Environment display system 930 receives environment map 940 from data transport system 920 and displays the environment as a texture projection on a display 955. Specifically, environment display system 930 includes a data storage unit 935, a texture projection generation unit 932, an optional triangularization unit 938, a texture rendering unit 937, display 955, a user input device 952, and a view window determination unit 953. Environment map 940 is stored in data storage unit 935. In some embodiments of the present invention data storage unit 935 is a computer memory system or a data storage system (e.g., a disk drive) of a computer system. Display unit 955 is typically a computer monitor, a head-mounted display, or a television set. User interface device 952 can be for example, a joystick, a mouse, a track ball, a head-tracking device, or a keyboard. View window determination unit 953 provides a view window 955 which indicates the area that is visible to viewer 105 (FIG. 1). Generally, view window determination unit 953 determines view window 954 based on user input from user input device 952.

Texture projection generation unit 932 creates a texture projection 934 as described above. Usually, texture projection 934 uses the same base curved surface and the same set of initial polygonal curved surfaces as used by texture projection 914. However, the number of facets in texture projection 934 need not equal the number of facets in texture projection 914. Texture rendering unit 937 texture maps environment map 940 in data storage unit 935 onto a visible portion of texture projection 934. Specifically, texture rendering unit 937 aligns the initial polygonal curved surfaces of the texture projection from texture projection unit 932 with the two-dimensional polygonal images of the environment map. Then, the color for each vertex of a facet is read from the appropriate two-dimensional polygonal image of the environment map. If a facet contains multiple pixels, the color for the non-vertex pixels can be interpolated can be retrieved from the texture map by interpolating the texture coordinates from the vertex coordinates. This process is repeated for each facet in the visible portion of texture projection 934. The visible portion of texture projection 934 is typically determined by view window 954. Conventional texture mapping and line clipping techniques are used by texture rendering unit 937 to create the image on display 955 based on view window 954, environment map 940, and texture projection 934.

Some embodiments of texture rendering unit 937 are optimized for texturing triangles. Thus, in some embodiments of the present invention, texture projection 934 is triangularized by triangularization unit 938 for texture rendering unit 937. Triangularization of texture projection 934 involves converting the facets of texture projection 934 from polygonal curved surfaces into triangles. For triangular curved surfaces, triangularization is accomplished by using the vertices of each facet as a vertex of a triangle rather than a vertex of a triangular curved surface.

Figure 11B:
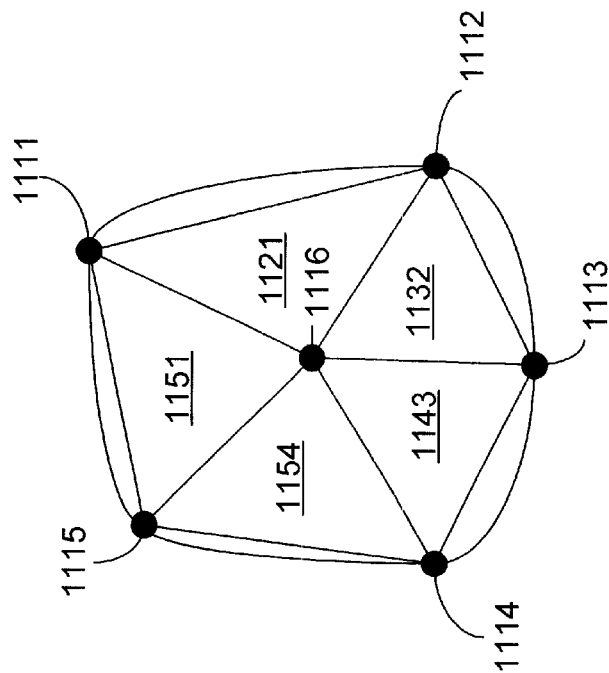
FIGS. 11(a)–11(b) are illustrations of the triangularization of a pentagonal curved surface.
Figure 11A:
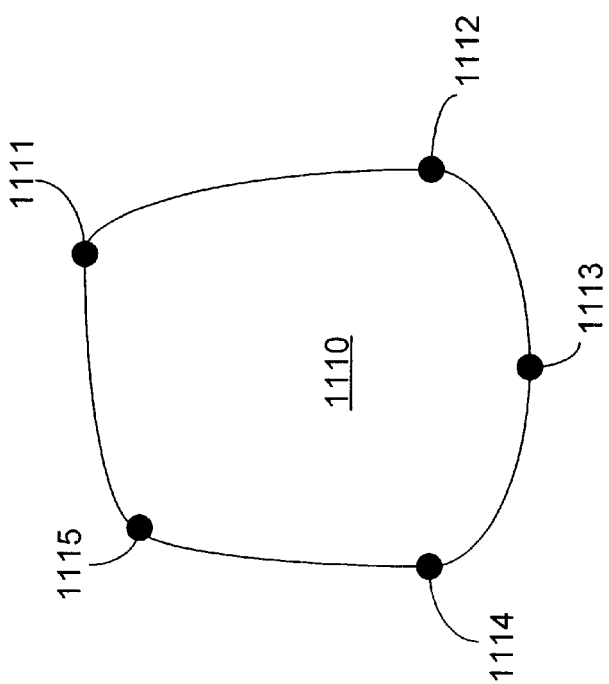

FIGS. 11(a)–11(b) illustrate a method to triangularize a pentagonal curved surface in accordance with one embodiment of the present invention. However, the method of FIGS. 11(a)–11(b) can easily be adapted to triangularize any polygonal curved surface. FIG. 11(a) shows a pentagonal curved surface 1110 having vertices 1111–1115. As illustrated in FIG. 11(b), a triangularization vertex 1116 is selected on pentagonal curved surface 1110. Usually, triangularization vertex 1116 is at the center of pentagonal curve 1110. Each pair of adjacent vertices of pentagonal curve 1110 and triangularization vertex 1116 together form the vertices of a triangle. Thus, pentagonal curved surface 1110 is triangularized into triangle 1151 having vertices 1115, 1111, and 1116; triangle 1121 is formed having vertices 1112, 1111, and 1116; triangle 1132 having vertices 1113, 1112, and 1116; triangle. 1143 having vertices 1114, 1113, and 1116; and triangle 1154 having vertices 1115, 1114, and 1116.

Figure 12B:
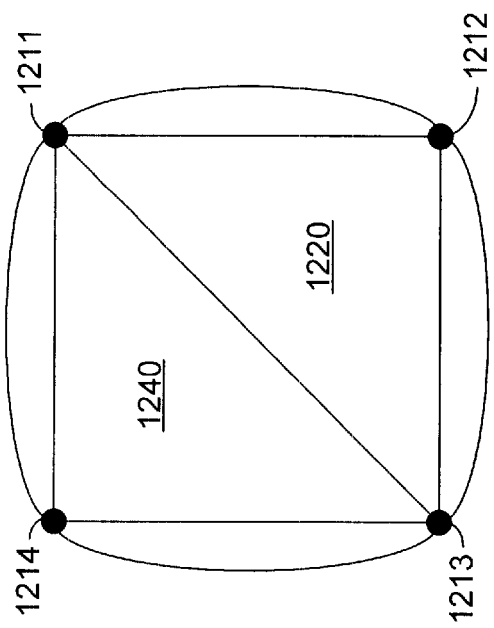
FIGS. 12(a)–12(b) are illustrations of the triangularization of a tetragonal curved surface.
Figure 12A:
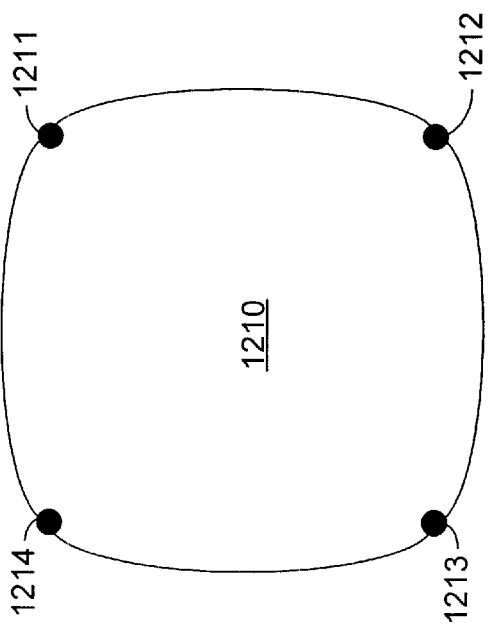

As illustrated in FIGS. 12(a)–12(b), a tetragonal curved surface 1210 having vertices 1211, 1212, 1213, and 1214 can be triangularized into a triangle 1240 having vertices 1211, 1213, and 1214, and a triangle 1220 having vertices 1211, 1213, and 1212. The triangularization method illustrated in FIGS. 12(a)–12(b) would be equivalent to the triangularization method of FIGS. 11(a)–11(b) if the triangularization vertex is selected to be equal to one of the vertices of the polygonal curved surface.

In some embodiments of the present invention, dedicated hardware implementations of texture rendering unit 937 and texture projection generation unit 932 are used. However, most embodiments of the present invention use a processor to execute software implementations of texture rendering unit 937 and texture projection generation unit 932. Although some embodiments may use a combination of hardware and software implementations.

Figure 13:
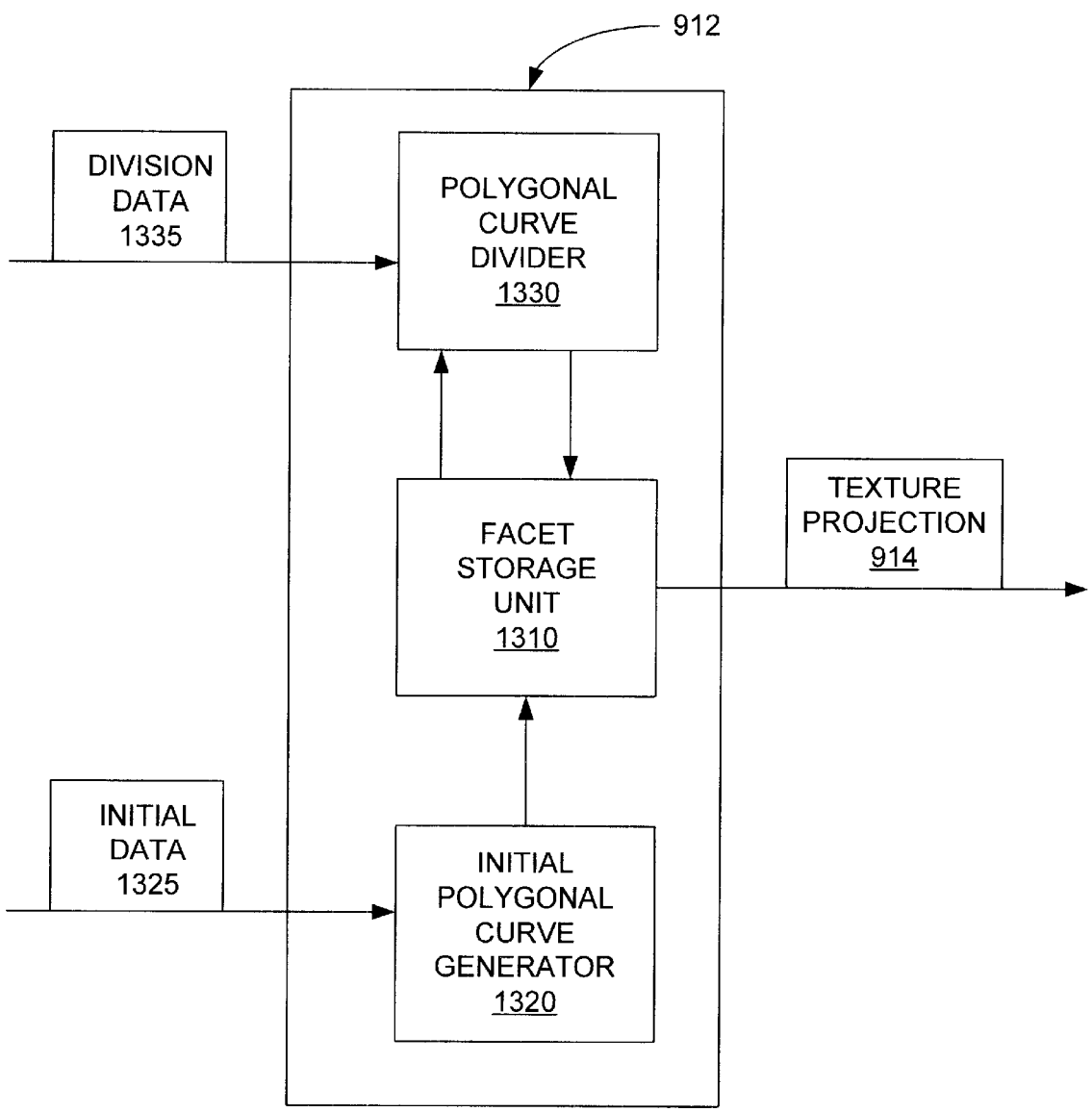
FIG. 13 is a block diagram of a texture projection unit in accordance with one embodiment of the present invention.

FIG. 13 is a block diagram of one embodiment of texture generation projection generation unit 912, which generates texture projection 914. Specifically, the embodiment of FIG. 13 includes a facet storage unit 1310, an initial polygonal curved surface generator 1320, and a polygonal curved surface divider 1330. Initial polygonal curved surface generator 1320 receives initial data 1325 for generating texture projection 914. Initial data 1325 may include information such as the shape of the initial polygonal curved surfaces, the base curved surface to be used, and the number of initial polygonal curved surfaces. From initial data 1325, initial polygonal curved surface generator 1320 generates the initial polygonal curved surfaces for texture projection 914 and stores the initial polygonal curved surfaces in facet storage unit 1310. Facet storage unit 1310 is typically a random access memory (RAM) device. For example, in one embodiment of texture projection generation unit 912, facet storage unit 1310 is part of the memory system of a general purpose computer.

After the initial polygonal curved surfaces are generated, polygonal curved surface divider 1330 divides the initial polygonal curved surfaces into a plurality of second-generation polygonal curved surfaces. Polygonal curved surface divider 1330 is controlled by division data 1335, which may include information such as the division method for creating the next-generation polygonal curved surfaces, the number of generations, or the number of facets. Polygonal curved surface divider 1330 recursively divides each generation of polygonal curved surfaces into a group of next-generation polygonal curved surfaces. Specifically, polygonal curved surface divider 1330 retrieves each Z-generation polygonal curved surface from facet storage unit 1310, divides the retrieved Z-generation polygonal curved surface into a plurality of Z+1-generation polygonal curved surfaces, and stores the Z+1-generation polygonal curved surfaces back into facet storage unit 1310. After polygonal curved surface divider 1330 finishes dividing the polygonal curved surfaces, the last generation of polygonal curved surfaces in facet storage unit 1310 forms texture projection 914.

As explained above, immersive videos, which are composed of hundreds or even thousands of environment maps, are a natural extension of environment mapping. However, the large amount of data required for immersive videos may be beyond the processing capabilities of most computer systems. Conventional compression techniques have been used to reduce the amount of data required for immersive videos. However, the processing requirements to decompress the environment maps as well as displaying the proper portions of the environment map may be beyond the processing power of most environmental display systems.

Figure 14:
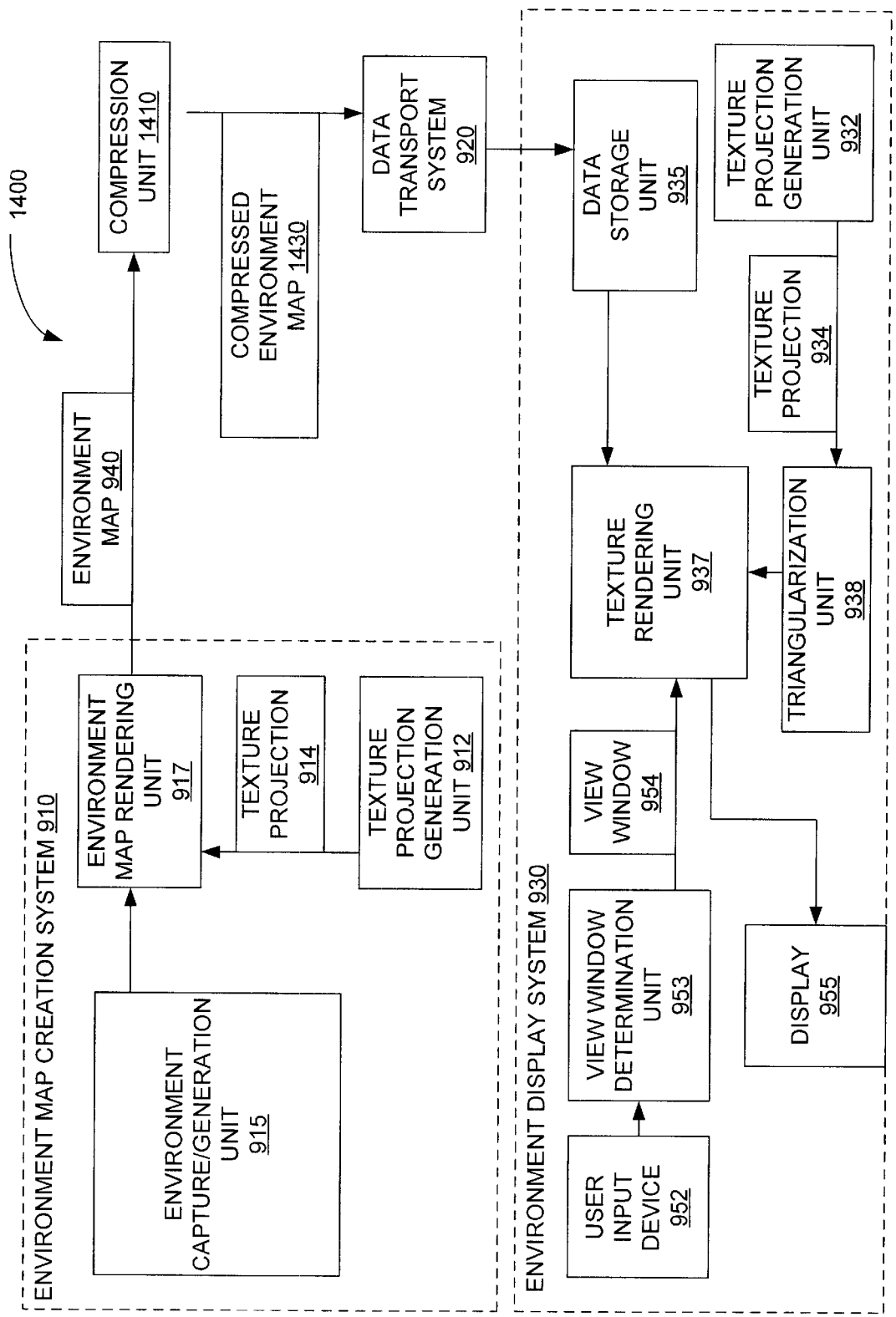
FIG. 14 is a block diagram of environment capture and display system 1400 including compression and decompression units in accordance with one embodiment of the present invention.

Accordingly, some embodiments of the present invention use novel compression and decompression units to compress the environment maps without requiring excessive processing for decompression. FIG. 14 shows an embodiment of an environment capture and display system 1400, which can be used for creating and displaying immersive videos. Environment capture and display system 1400 is similar to environment capture and display system 900 (FIG. 9), thus the same reference numerals are used to describe similar elements. Furthermore, for brevity descriptions of the similar elements are not repeated. Environment capture and display system 1400 includes a compression unit 1410 and a decompression unit 1420. Compression unit 1410 receives environment map 940 from environment map creation system 910 and creates a compressed environment map 1430 to be transported by data transport system 920. Decompression unit 1420 is part of environment display system 930 and is configured to partially decompress compressed environment map 1430 for texture rendering unit 937. Specifically, compression unit 1410 compresses environment map 940 so that decompression unit 1420 can decompress specific parts of compressed environment map 1430, rather than requiring decompression of compressed environment map 1430 in its entirety. Decompression unit 1420 receives view window 954, identifies the portions of compressed environment map 1430 that are needed by texture rendering unit 937, and decompresses the needed portions. In some embodiments of the present invention, decompression unit 1420 uses texture projection 934 to convert the coordinate systems of view window 954 to the coordinate system of compressed environment map 1430 or vice versa. Because only part of compressed environment map 1430 is decompressed, decompression unit 1420 requires far less processing time than conventional decompression units. Decompression unit 1420 is explained in further detail below with respect to FIG. 19.

Figure 15:
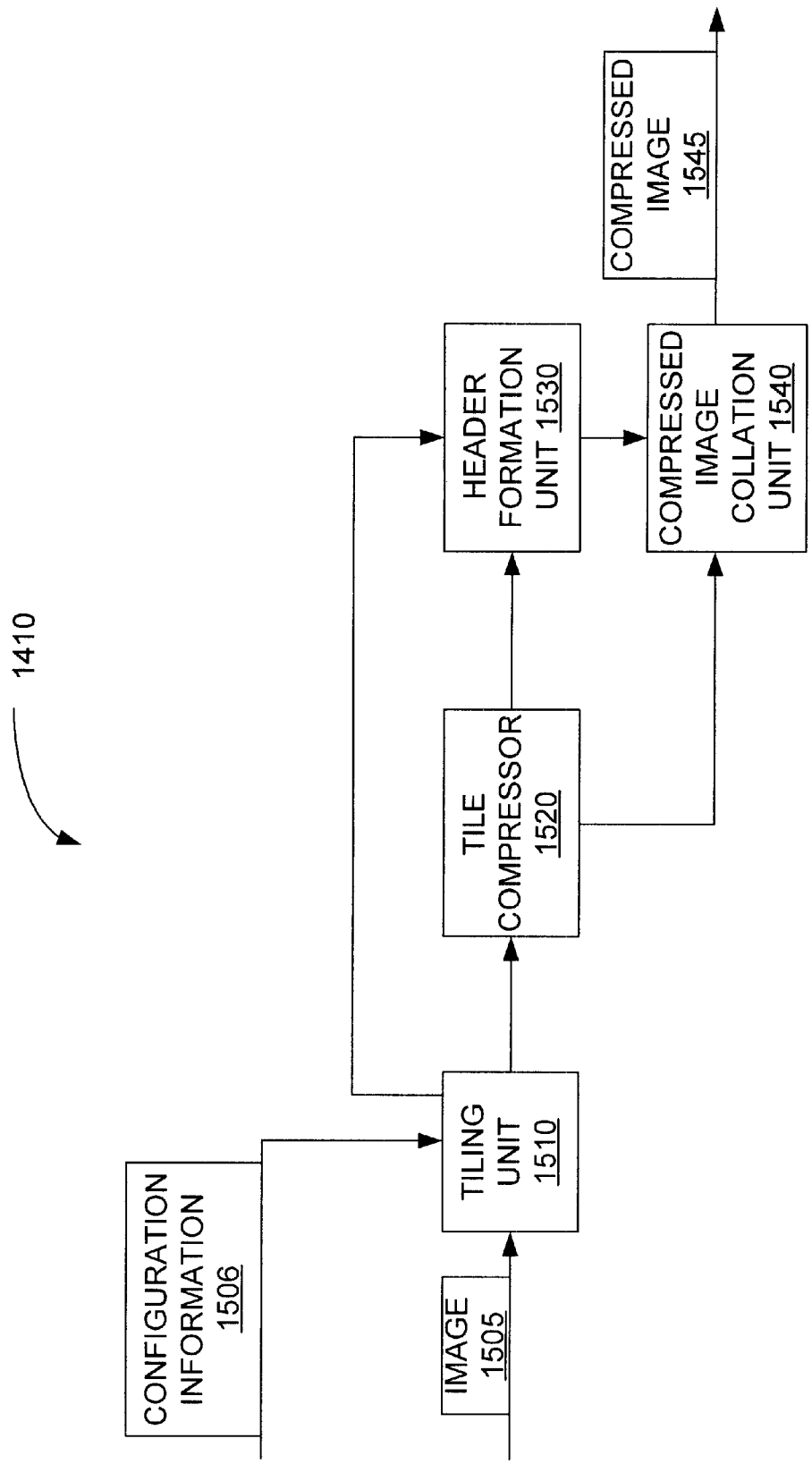
FIG. 15 is a block diagram of a compression unit in accordance with one embodiment of the present invention.

FIG. 15 is a block diagram of compression unit 1410 in accordance with an embodiment of the present invention. The embodiment of FIG. 15 includes a tiling unit 1510, a tile compressor 1520, a header formation unit 1530, and a compressed image collation unit 1540. Tiling unit 1510 receives an image 1505, which can be, for example, environment map 940 (FIG. 14), and configuration information 1506. Configuration information 1506 provides information such as the tile size or sizes, the vertices of specific tiles, and/or other parameters for tiling unit 1510. As illustrated in FIG. 16(a), tiling unit 1510 divides image 1505 into a plurality of tiles such as tile 1610, 1620, and 1630. Tiles are illustrated using dashed lines in FIG. 16(a) and 16(b). Generally, tiling unit 1510 uses rectangular tiles of the same shape and area. However, some embodiments may use other shapes having different sizes and areas. Some embodiments of tiling unit 1510 are pre-configured for a specific tiling pattern, and would not require configuration information 1506. As explained above, environment maps are typically formed by concatenating a plurality of the two-dimensional polygonal images. To ease the burden on decompression unit 1420, tiling unit 1510 generally limits a tile to be contained in only one of the two-dimensional polygonal images. Specifically, as illustrated in FIG. 16(b), environment map 1020 of FIG. 10(b) is tiled so that no tile crosses a border of two-dimensional polygonal images 1021–1026.

Once image 1505 has been tiled, tile compressor 1520 compresses each tile individually. Since each tile can be considered as a separate two-dimensional image, tile compressor 1520 can use conventional image compression methods, such as JPEG, run-length encoding, and GIF. Tile compressor 1520 provides each compressed tile to compressed image collation unit 1540, and provides the size of each compressed tile to header formation unit 1530.

Header formation unit 1530 creates a header 1710 (FIG. 17) for a compressed image 1545. As illustrated in FIG. 17, compressed image 1545 is a binary string of data formed by header 1710 followed by N (the number of tiles used by tiling unit 1510) compressed tiles 1545_1, 1545_2, . . . 1545_N. In some embodiments of the invention, header 1710 contains a tile descriptor for each compressed tile. Each tile descriptor may contain information, such as the size of the corresponding compressed tile (typically given in bytes), the shape of the corresponding tile in image 1505, and the vertices of the corresponding tile in image 1505. For embodiments of compression unit 1410 that are pre-configured for a specific tile size, the tile descriptor in header 1710 might only contain the sizes of the compressed tiles. Alternatively, as illustrated in FIG. 18(a), a compressed environment map 1800 contains N compressed tiles 1800_1, 1800_2, . . . 1800_N, preceded by a header 1810 which contains N offset values 1810_1, 1810_2, . . . 1810_N. Each offset value 1810_x indicates the location of compressed tile 1800_x in compressed image 1800. Each offset value 1810_x can be computed by adding the size of compressed tile 1800_(x−1) to offset value 1810_(x−1), where x is an integer between 2 and N, inclusive. Offset value 1810_1 is equal to the size of header 1810 which is equal to N times the number of bytes used per offset value. Thus, offset values of header 1810 are also considered as tile descriptors.

FIG. 18(b) illustrates a compressed environment map 1830 in accordance with one embodiment of the invention. Compressed environment map 1830 includes a header 1840 followed by 64 compressed tiles 1860_1–1860_64, followed by a four-byte format number 1870. Format number 1870 can be any four-byte number as agreed upon between compression unit 1410 and decompression unit 1420. Four-byte format number 1870 allows decompression unit 1420 to insure that compressed environment map 1830 is in the proper format. Header 1840 includes map length 1841 as a four byte number, a second format number 1842, 64 four-byte offset values 1850_1–1850_64 corresponding to compressed tiles 1860_1–1860_64, respectively, and compression information 1843. Specifically, the embodiment of FIG. 18(b) uses JPEG compression using the same JPEG coefficient table to form each compressed tile 1860_1–1860_64. Rather than storing a copy of the JPEG coefficient table with each compressed tile, the JPEG coefficient table is stored in compression information 1843.

As explained above with respect to FIG. 14, decompression unit 1420 decompresses only a portion of compressed environment map 1430 based on view window 954. Generally, only compressed tiles that contain relevant data, i.e., texels needed to create the environment within view window 954 need to be decompressed. However, determination of exactly which compressed tiles contain relevant data may be more processing intensive than decompressing a few irrelevant tiles, i.e., tiles that do not contain relevant data. Thus, some embodiments of the present invention select and decompress a subset of the compressed tiles, where the subset may contain irrelevant tiles. However, the subset of compressed tiles for decompression does include all compressed tiles having relevant data.

Figure 19:
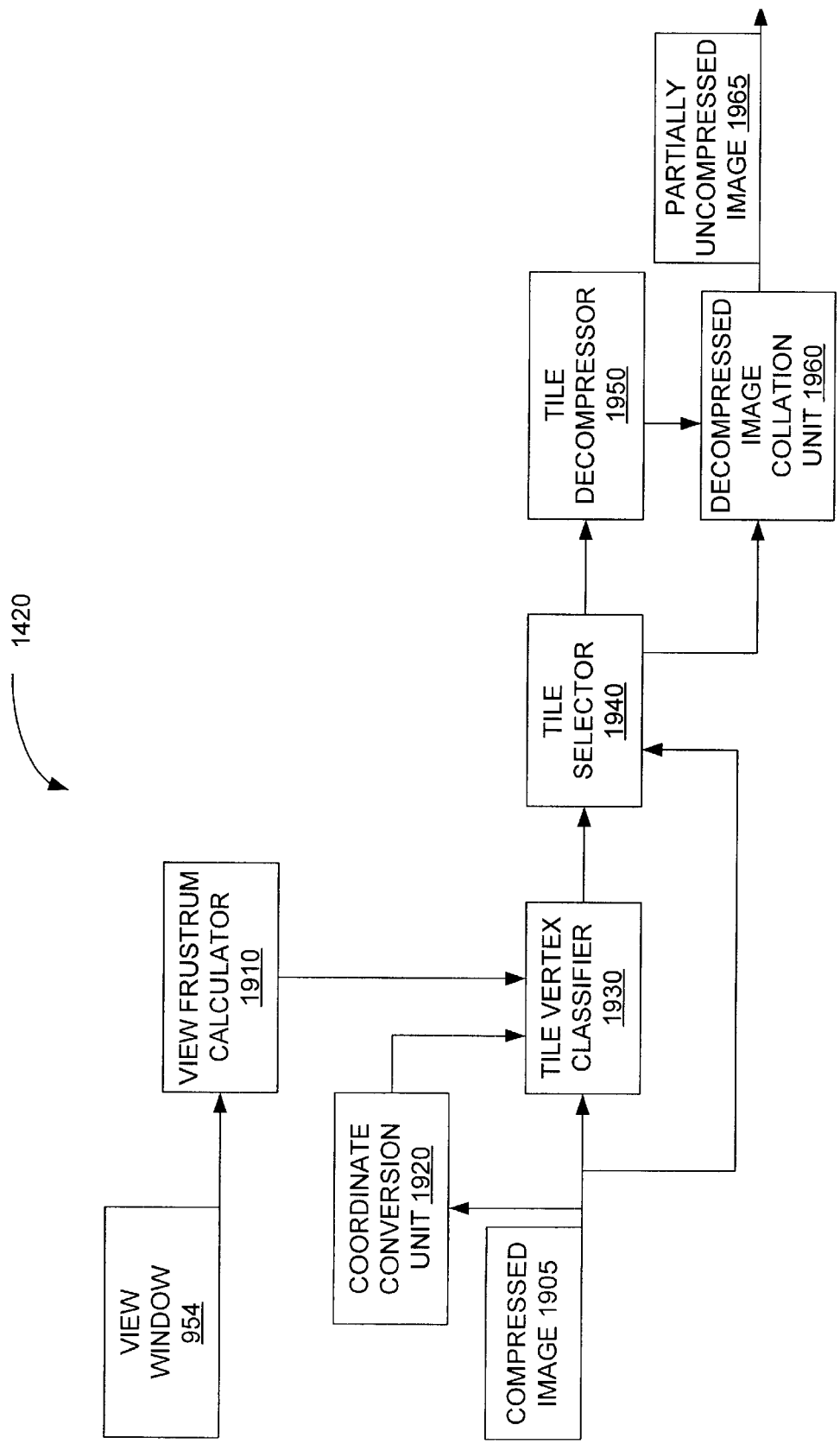
FIG. 19 is a block diagram of a decompression unit in accordance with one embodiment of the present invention.

FIG. 19 is a block diagram of one embodiment of decompression unit 1420 which can be used with the environment maps as described above. The embodiment of FIG. 19 includes a view frustum calculator 1910, an optional coordinate conversion unit 1920, a tile vertex classifier 1930, a tile selector 1940, and a tile decompressor 1950. View frustum calculation unit 1910 receives view window 954 and calculates the normal vectors of a view frustum encompassing view window 954. A view frustum is the solid angle projection from viewer 105 (typically at the origin) which encompasses view window 954. Generally, view window 954 is rectangular, thus the view frustum for view window 954 would resemble a four sided pyramid and have four normal vectors, i.e., one for each side of the view frustum. A view frustum normal vector points perpendicular to the plane containing a side of the view frustum. The embodiments described herein use view frustum normal vectors that point into the view frustum. Other embodiments may use view frustum normal vectors that point out of the view frustum. If view window 954 is not rectangular, a rectangular view frustum can be created by using a rectangular secondary view window that encompasses view window 954. However, additional irrelevant tiles may be decompressed by using the rectangular secondary view window.

The view frustum normal vectors are provided to tile vertex classifier 1930. Compressed image 1905, which can be for example compressed environment map 1430 (FIG. 14) is also provided to tile vertex classifier 1930. Generally, the coordinate system of the view window 954 is the same as the coordinate system of compressed image 1905. However, in some embodiments the coordinate systems differ and coordinate conversion unit 1920 converts the coordinates of the vertices of the compressed tiles to match the coordinate system of view window 954.

Tile vertex classifier 1930 uses the view frustum normal vectors to classify the vertex of each compressed tile to determine whether the vertex is above, below, left or right of the view frustum. Above, below, left and right are relative to the view frustum, rather than the viewer or some other fixed object. Tile vertex classifier 1930 can extract the vertices from the header of compressed image 1905. Alternatively, tile vertex classifier 1930 may use a predefined set of tile vertices, which is also used by tiling unit 1510 (FIG. 15). The relationship of a vertex with the view frustum is computed using the inner product (or dot product) of the vertex with the view frustum normal vectors. For example, if the inner product of a vertex with the right side view frustum normal vector is less than zero, then the vertex is to the right of the view frustum. Similarly, if the inner product of a vertex with the left side view frustum normal vector is less than zero, then the vertex is to the left of the view frustum. Table 4 below provides pseudo code for one implementation of tile vertex classifier 1930. Using view frustum normal vectors with vertices on the opposite side (through the origin of the coordinate system) of the view window may cause strange seeming results. For example, a vertex on the opposite side of view window 954 may be classified as left of, right of, above, and below the view frustum. However, these abnormal vertex classifications can easily be avoided by tile selector 1940. For example, titles on the opposite side of view window 954 can be eliminated by using a view axis vector, which points from the origin to the center of view window 954. Specifically, if the inner product of the view axis vector with each of the vertices of a tile is less than zero, the tile is on the opposite side of view window 954 and can be ignored.

Figure 20:
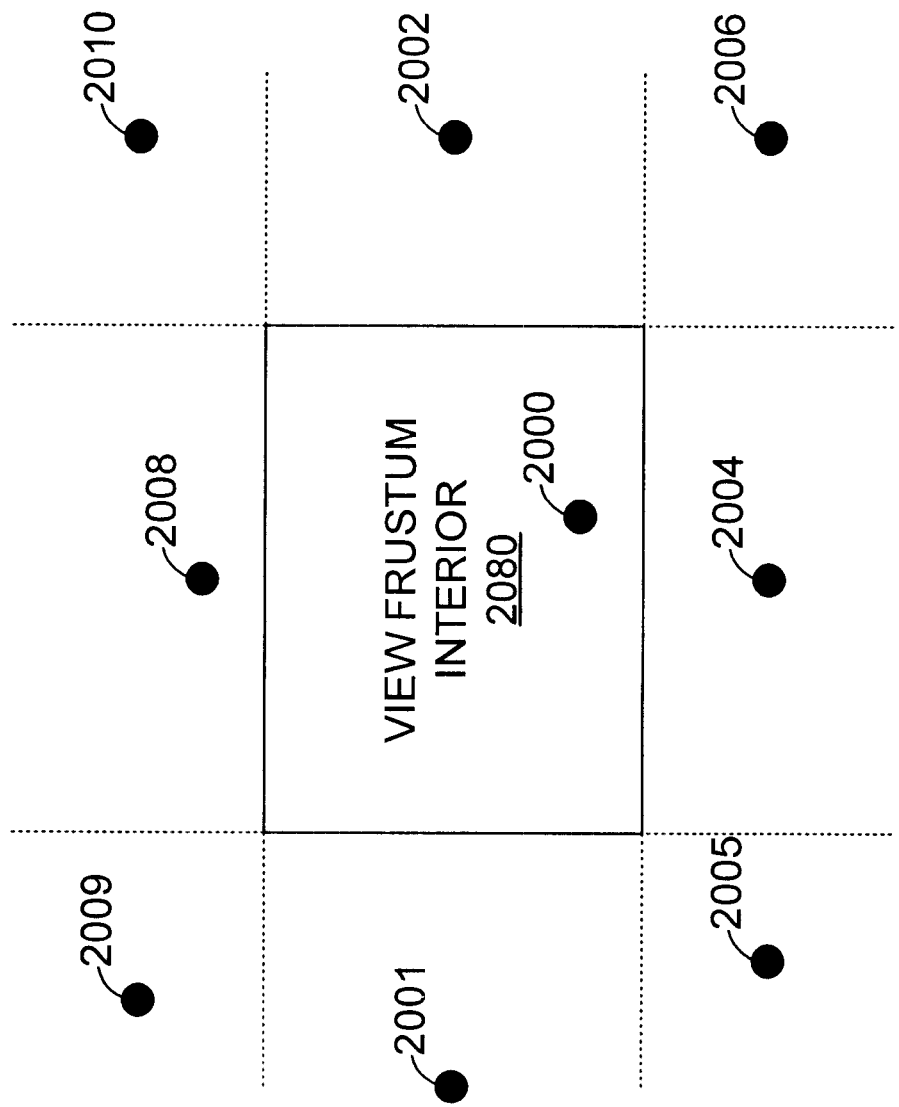
FIG. 20 illustrates a vertex classification scheme in accordance with one embodiment of the present invention.
Figure 21B:
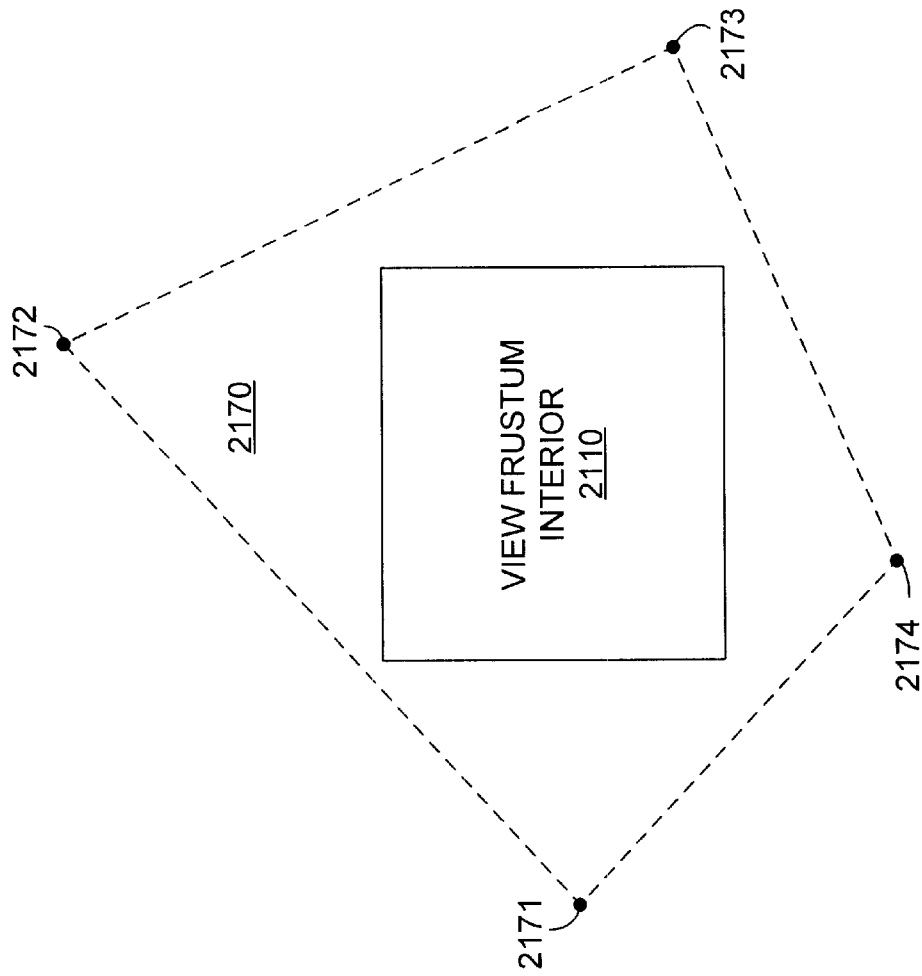
FIGS. 21(a)–21(d) illustrates a tile selection scheme in accordance with one embodiment of the present invention.
Figure 21A:
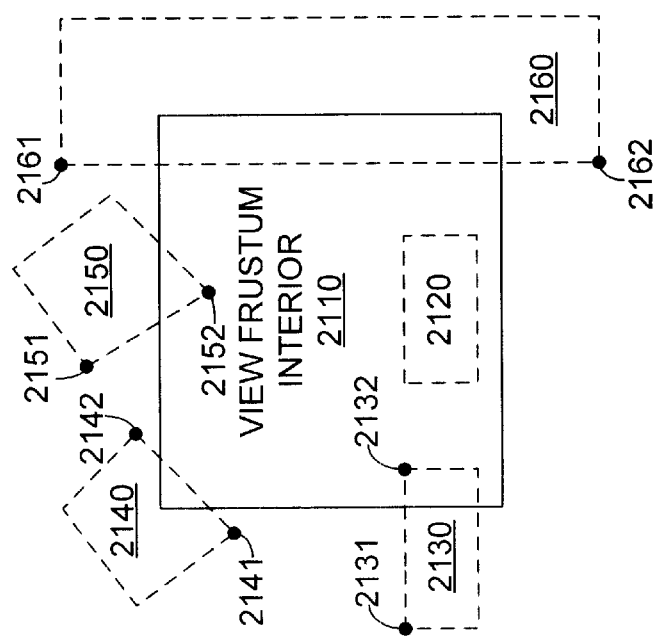
Figure 21D:
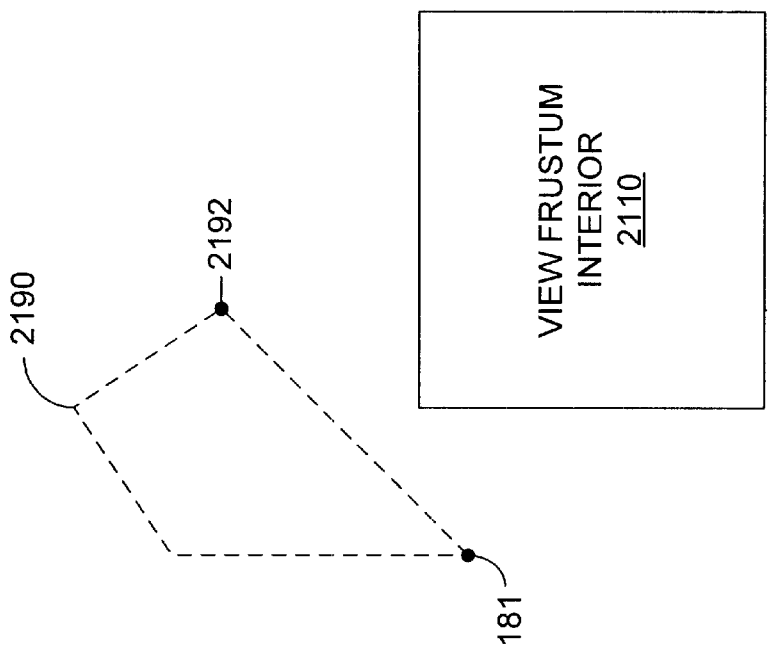
Figure 21C:
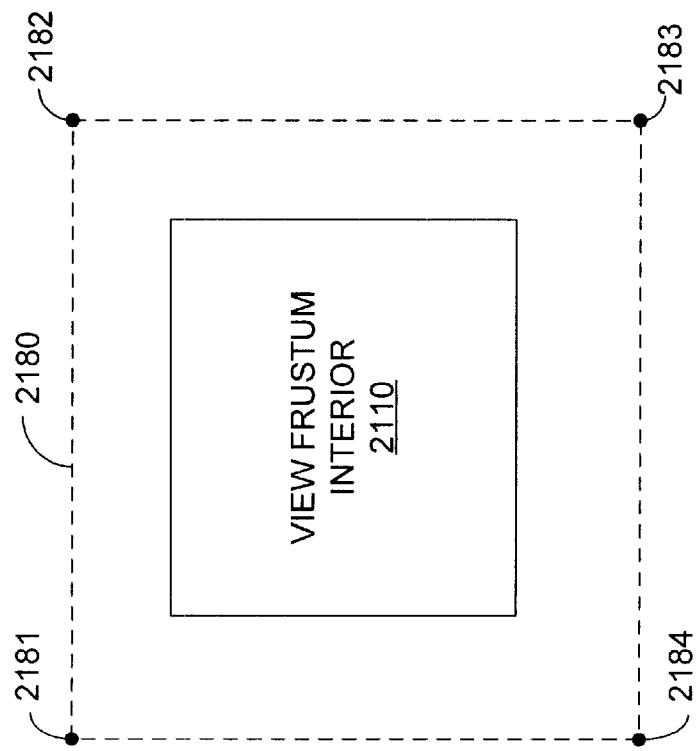

In one embodiment of tile vertex classifier, a 4-bit coding scheme is used to classify each vertex, i.e., each vertex is given a 4 bit bit-code classification. Specifically, bit 3 indicates whether a vertex is above the view frustum, bit 2 indicates whether a vertex is below the view frustum, bit 1 indicates whether a vertex is to the right of the view frustum, and bit 0 indicates whether the vertex is to the left of the view frustum. For clarity, the bit coding scheme is described herein using 1 as the true state and 0 as the false state. Thus, if a vertex is left of the view frustum bit 0 of the bit code for the vertex is set to 1. If a vertex is both above and to the left of the view frustum then both bit 3 and bit 0 of the bit code is set to 1. If a vertex is in the view frustum, i.e., it is not to the left, not to the right, not above, and not below the view frustum, the vertex would have a bit code of 000b (the "b" as used herein indicates a binary number). FIG. 20 illustrates the bit coding scheme. For clarity, FIG. 20 shows only a two dimensional slice of the view frustum. Specifically, FIG. 20 shows a view frustum interior 2080 and various vertices 2000, 2001, 2002, 2004, 2005, 2006, 2008, 2009, and 2010. Table 3 provides the region attribute and corresponding bit code for the vertices of FIG. 20.

TABLE 3

| Vertex | Attribute with respect to View Frustum | Bit Code |
| --- | --- | --- |
| 2000 | Inside | 0000b |
| 2001 | Left | 0001b |
| 2002 | Right | 0010b |
| 2004 | Below | 0100b |
| 2005 | Below and Left | 0101b |
| 2006 | Below and Right | 0110b |
| 2008 | Above | 1000b |
| 2009 | Above and Left | 1001b |
| 2010 | Above and Right | 1010b |

Table 4 contains pseudo code for an embodiment of tile vertex classifier for use with the environment mapping system described above. Furthermore, the embodiment of Table 4 uses the bit-code scheme described above and illustrated by FIG. 20 and Table 3.

TABLE 4

```
Variable Definition:
  T_tot       = number of tiles
  T_Vert      = number of vertices per tile
  V (x) (y)   = Vertex number y of tile number x
  V_BC (x) (y) = Bit code for Vertex number y of tile
                 number x
  NV (z)      = Normal vector number z where z=0 is left,
                z=1 is right, z=2 is below, and
                z=3 is above
Code:
  for x = 1 to T_tot {x cycles through the tiles}
    for y = 1 to T_Vert {y cycles through the vertices
                         on each tile}
      V_BC (x) (y) =0000b
      for z = 1 to 4 {z cycles through the view
                      frustum normal vectors}
        if inner_product (V (x) (y), NV (z)) < 0 then
          V_BC (x) (y) =V_BC (x) (y) + 2^z
      next z
    next y
  next x
```

Decompression unit 1420 may be used with flat two-dimensional images. For example, some applications only display a portion of a large picture. The displayed portion can be considered a view window. Vertex classification is performed on a two-dimensional coordinate system with the origin of the coordinate system in the bottom left corner of the image. A vertex can be classified by comparing the coordinates of the vertex with the coordinates of the bottom left vertex of the view window and with the coordinates of the top right vertex of the view window. Table 4 contains pseudo code for an embodiment of tile vertex classifier for use with flat two-dimensional images.

TABLE 5

```
Variable Definition:
  T_tot        = number of tiles
  T_Vert       = number of vertices per tile
  V (x) (y)    = Vertex number y of tile number x
  X_V (x) (y)  = X-coordinate of vertex number y of tile
                  number x
  Y_V (x) (y)  = Y-coordinate of vertex number y of tile
                  number x
  V_BC (x) (y) = Bit code for Vertex number y of tile
                  number x
  X_VW_BL      = X-coordinate of the bottom left vertex of
                  the view window
```

TABLE 5-continued

```
  Y_VW_BL      = Y-coordinate of the bottom left vertex of
                  the view window
  X_VW_TR      = X-coordinate of the top right vertex of
                  the view window
  Y_VW_TR      = Y-coordinate of the top right vertex of
                  the view window
Code:
  for x = 1 to T_tot {x cycles through the tiles}
    for y = 1 to T_Vert {y cycles through the vertices
                          on each tile}
      V_BC (x) (y) =0000b
      if (X_V (x) (y) <X_VW_BL) then
        V_BC (x) (y) =V_BC (x) (y) + 0001b
      if (X_V (x) (y) >X_VW_TR) then
        V_BC (x) (y) =V_BC (x) (y) + 0010b
      if (Y_V (x) (y) <Y_VW_BL) then
        V_BC (x) (y) =V_BC (x) (y) + 0100b
      if (Y_V (x) (y) >Y_VW_TR) then
        V_BC (x) (y) =V_BC (x) (y) + 1000b
    next y
  next x
```

Tile vertex classifier 1930 provides the vertex classifications to tile selector 1940. Tile selector 1940 then selects a subset of the tiles in compressed image 1905 for decompression unit 1950. The subset of selected tiles chosen by tile selector 1940 should contain all tiles which contain relevant data, i.e., visible texels. Inclusion of irrelevant tiles, i.e., tiles containing only invisible texels, should be minimized. However, the processing time required to eliminate all irrelevant tiles from the subset of selected tiles may be greater than the processing time of decompressing a few irrelevant tiles. Thus, many embodiments of the present invention do not completely eliminate irrelevant tiles from the subset of selected tiles.

FIG. 21(*a*)–(*d*) illustrate how one embodiment of tile selector 1940 selects a subset of tiles in compressed image 1905. For clarity, FIGS. 21(*a*)–(*d*) show only a two dimensional slice of the view frustum. Specifically, FIGS. 21(*a*)–21(*d*) show a view frustum interior 2110 and various tiles 2120, 2130, 2140, 2150, 2160, 2170, 2180, and 2190. A tile contains visible texels if any part of the tile is within the view frustum. A tile can become visible in only three basic situations. First, the tile can be completely within view frustum interior 2110, such as tile 2120. Second, the tile can completely encompass the view frustum, such as tiles 2170 (FIG. 21(*b*)) and 2180 (FIG. 21(*c*)). Finally, the tile contains relevant data if the tile is only partially within the view frustum, such as tiles 2130, 2140 2150, and 2160. Each of these three conditions can be detected separately or a single test may detect multiple conditions.

For example, if a tile is partially within the view frustum at least one side of the tile must cross one of the sides of the view frustum. Analysis of the vertex classifications can detect all such tiles. Specifically, for any tile that is partially within the view frustum, the bitwise AND operation of the bit-code (as defined above) of at least one pair successive vertices must equal 0000b. As illustrated in FIGS. 21(*a*), vertices 2131 and 2132 of tile 2130 have bit codes of 0001b and 0000b, respectively. Thus, the bitwise logic AND of the bit codes of vertices 2131 and 2132 is equal to 0000b. Table 6 provides the bit-codes and the bitwise logic AND of various successive vertices of the tiles in FIG. 21(*a*). Note that at least one successive pair of each tile that is partially within the view frustum is equal to 0000b.

TABLE 6

| TILE | VERTEX | Bit-Code | Vertex | Bit-Code | Bitwise Logic AND |
|---|---|---|---|---|---|
| 2130 | 2131 | 0001b | 2132 | 0000b | 0000 |
| 2140 | 2141 | 0001b | 2142 | 1000b | 0000 |
| 2150 | 2151 | 1000b | 2152 | 0000b | 0000 |
| 2160 | 2161 | 1000b | 2162 | 0100b | 0000 |

The bitwise logic AND test between two successive vertices also detects tiles completely within the view frustum, such as tile 2120, because all the vertices of such tiles is equal to 0000b. Furthermore, the bitwise logic AND test between two successive vertices also detects certain types of tiles which encompass the view frustum, such as tile 2170 (FIG. 21(*b*)). Specifically, if a tile has a first vertex that is only above or only below the view frustum, and a second successive vertex that is only to the left or only to the right of the view frustum, then the bitwise logic AND of the first and second vertices is equal to 0000b. For example, vertices 2172 and 2171 of tile 2170 have bit-codes 1000b and 0001b, respectively. Thus, the bitwise logic AND of the bit-codes of vertices 2172 and 2171 is equal to 0000b. However, the bitwise logic AND test also selects irrelevant tiles such as tile 2190 (FIG. 21(*d*)), which contains no visible texels, because vertices 2191 and 2192 have the same bit-codes as vertices 2171 and 2172, respectively. Although inclusion of irrelevant tiles is inefficient, as explained above, the processing time of decompressing the irrelevant tile may be less than the processing time required to eliminate the irrelevant tiles from the subset of selected tiles.

A specific class of visible tiles is not detected by the bitwise logic AND test. As shown in FIG. 21(*c*), tile 2180 encompasses the view frustum and is thus partially visible. However, bitwise logic AND of any two successive vertices is not equal to 0000b. Thus, a second test is required to detect this class of tiles. For this class of tiles, the bitwise exclusive-OR (XOR) of the bit-code of both pair of opposite vertices results in 1111b. For example, the bit-codes of vertices 2181 and 2183 are equal to 1001b and 0110b. Thus, the bitwise XOR of the bit-codes of vertices 2181 and 2183 is equal to 1111b. Similarly, the bit codes of vertices 2182 and 2184 are equal to 1010b and 0101b. Thus, the bitwise XOR of the bit-codes of vertices 2182 and 2184 is equal to 1111b. The combination of the bitwise logic AND test with the bitwise XOR test detects all tiles having visible texels. Table 7 provides the pseudo code for an embodiment of tile selector 1940 using the bitwise logic AND test and the bitwise XOR test to select a subset of tiles.

TABLE 7

```
Variable Definition:
    T_tot       = number of tiles
    T_Vert      = number of vertices per tile
    V (x) (y)   = Vertex number y of tile number x
    V_BC (x) (y) = Bit code for vertex number y of tile
                  number x
    T_VIS (x)   = Binary flag indicating tile number x
                  is selected as a member of the subset of
                  selected tiles.
    & indicates a bitwise logic AND function
    # indicates a bitwise XOR function
    == is read as "is equal"
Code:
    for x = 1 to T_tot {x cycles through the tiles}
        T_VIS (x) =0
```

TABLE 7-continued

```
    for y = 1 to T_Vert {y cycles through the vertices
                         on each tile}
        if (V (x) (y) & V (x) ((y+1) MOD T_Vert) == 0 then
            T_VIS (x) =1
    next y
    if T_VIS (x) =0 then
        if (V (x) (1) # V (x) (3)) == 1111b) and
           (V (x) (2) # V (x) (4)) == 1111b) then
            T_VIS (x) =1
next x
```

The subset of selected tiles are sent to tile decompressor 1950, which decompresses the selected tiles using the corresponding decompression method to the compression method used by tile compressor 1520 (FIG. 15). The decompressed tiles are sent to decompressed image collation unit 1960, which also receives the corresponding vertex coordinates or tile number for each decompressed tile. Decompressed image collation unit 1960 produces a partially decompressed image 1965, which includes all tiles that contains visible texels.

Thus, texture rendering unit 937 (FIG. 9) receives a decompressed texture map that contains all the necessary texels to texture map view window 954. Because decompression unit 1420 only needs to partially decompress compressed environment map 1430 (FIG. 14), environment display system 930 can display a high resolution flicker-free immersive video on display 955.

In the above-described manner, high-resolution flicker-free immersive videos are made possible. Specifically, an immersive video system in accordance with embodiments of the present invention combine an efficient texture projection with a compression scheme, that allows partial decompression of the environment map. The various embodiments of the structures and methods of this invention that are described above are illustrative only of the principles of this invention and are not intended to limit the scope of the invention to the particular embodiments described. For example, in view of this disclosure, those skilled in the-art can define other polygonal curved surfaces, curved surfaces, curve division methods, environment mappings, facets, texels, tile selectors, tile compressors, tile decompressors, compression units, decompression units, tile vertex classifiers, and so forth, and use these alternative features to create a method or system according to the principles of this invention. Thus, the invention is limited only by the following claims.

APPENDIX I
Copyright (©) 1999 Enroute Inc.
All Rights Reserved

```
FILENAME: subdivide.cpp
#include <cstdlib>
#include <cmath>
#include <limits>
#include "tess.h"
void usage(const char *cmd)
{
    std: :cout << cmd << " nlevels method\n\n";
    std: :cout << " This sample program projects the face of
a cube onto a\n";
    std: :cout << "co-centered sphere, and recursively
subdivides the\n";
    std: :cout << "projection into quadrilaterals.\n\n";
    std: :cout << "The program requires two integer command
```

-continued

APPENDIX I
Copyright (©) 1999 Enroute Inc.
All Rights Reserved

```
line arguments: \n";
        std: :cout << "    nlevels      number of subdivision
levels\n";
        std: :cout << "    method       0 for cartesian subdivision, \n";
        std: :cout << "                 1 for arc subdivision,\n";
        std: :cout << "                 2 for area subdivision\n";
    }
    main(int argc,char *argv[])
    {
    if ( argc != 3 )
    {
        usage (argv [0]);
        exit (-1);
    }
    Quad q(
        Vector3 (-1.0, -1.0, -1.0),
        Vector3 ( 1.0, -1.0, -1.0),
        Vector3 ( 1.0,  1.0, -1.0),
        Vector3 (-1.0,  1.0, -1.0)
    Tess: :SubType type;
    switch ( atoi(argv[2]) )
    {
    case 0:
        type = Tess: :Cartesian;
        break;
    case 1:
        type = Tess: :Arc;
        break;
    case 2:
        type = Tess: :Area;
        break;
    default:
        usage (argv [0]);
        exit (-1)
    }
    Tess t (q, atoi (argv [1]), type);
    double minArea = std: :numeric_limits<double>: :max();
    double maxArea = 0.0;
    double minRatio = std: :numeric_limits<double>: :max();
    double maxRatio = 0.0;
    double areaSum = 0.0;
    double areaSum2 = 0.0;
    for ( Tess: :QuadList: :iterator i = t.quad.begin(); i !=
t.quad.end(); i++ )
    {
        // print out the quad vertices
        std: :cout << *i << "\n";
        const double area = i->sarea();
        areaSum += area;
        areaSum2 += area*area;
        if ( area < minArea ) minArea = area;
        if ( area > maxArea ) maxArea = area;
        const double ratio = i->aratio();
        if ( ratio < minRatio ) minRatio = ratio;
        if ( ratio > maxRatio ) maxRatio = ratio;
    }
    const double areaAvg =
areaSum/static_cast<double>(t.quad.size() );
    std: :cout << t.quad.size() << " quads\n";
    std: :cout << "min area " << minArea << " steradians\n";
    std: :cout << "max area " << maxArea << " steradians\n";
    std: :cout << "average area " << areaAvg << "\n";
    std: :cout << "area variance " <<
        (areaSum2 - 2.0*areaAvg*areaSum +
areaAvg*areaAvg*static_cast<double>(t.quad.size() ) )/
            static_cast<double>(t.quad.size() - 1) << "\n";
    std: :cout << "min arc ratio " << minRatio << "\n";
    std: :cout << "max arc ratio " << maxRatio << "\n";
    return 0;}
FILENAME : tess.h
#ifndef _TESS_H_
#define _TESS_H_
#include <list>
#include "quad.h"
class Tess
{
```

-continued

APPENDIX I
Copyright (©) 1999 Enroute Inc.
All Rights Reserved

```
public:
    enum SubType{
        Cartesian, // subdivide in the plane
        Arc,       // subdivide by equal arc length
        Area       // subdivide by equal area
    };
    Tess(const Quad& q,int nLevels,SubType type);
    typedef std: :list<Quad> QuadList;
    QuadList quad;
protected:
    int nLevels;         // number of subdivision levels
    SubType type;        // subdivision type
    //: recursive subdivision function
    void divide(const Quad& q,int level);
    //: planar subdivision
    void dividePlane(const Quad& q,Quad& sub0,Quad& sub1);
    //: arc division
    void divideArc(const Quad& q,Quad& sub0,Quad& sub1);
    //: area division
    void divideArea(const Quad& q,Quad& sub0,Quad& sub1);
};
#endif _TESS_H_
FILENAME: tess.cpp
#include <limits>
#include "tess.h"
Tess: :Tess(const Quad& q,int _nLevels,SubType _type)
: nLevels(_nLevels), type(_type) {
    Quad qs = q;
    if ( type != Cartesian ) {
        qs.v[0].normalize();
        qs.v[1].normalize()
        qs.v[2].normalize();
        qs.v[3].normalize();
    }
    divide(qs,0)
}
void
Tess: :divide(const Quad& q,int level) {
    if ( level == 2*nLevels ) {
        quad.push_back(q);
        return;
    }
    Quad q0,q1;
    switch (type) {
    case Cartesian:
        dividePlane (q,q0,q1);
        break;
    case Arc:
        divideArc(q,q0,q1);
        break;
    case Area:
        divideArea(q,q0,q1)
        break;
    }
    q0.rotateVertices ();
    q1.rotateVertices ();
    divide(q0,level + 1);
    divide(q1,level + 1);
}
void
Tess: :dividePlane (const Quad& q,Quad& sub0,Quad& sub1) {
    Vector3 v01;
    v01.x = 0.5*(q.v[0].x + q.v[1].x);
    v01.y = 0.5*(q.v[0].y + q.v[1].y);
    v01.z = 0.5*(q.v[0].z + q.v[1].z);
    Vector3 v32;
    v32.x = 0.5*(q.v[3].x + q.v[2].x);
    v32.y = 0.5*(q.v[3].y + q.v[2].y);
    v32.z = 0.5*(q.v[3].z + q.v[2].z);
    sub0.v[0] = q.v[0];
    sub0.v[1] = v01;
    sub0.v[2] = v32;
    sub0.v[3] = q.v[3];
    sub1.v[0] = v01;
    sub1.v[1] = q.v[1];
```

APPENDIX I
Copyright © 1999 Enroute Inc.
All Rights Reserved

```
            sub1.v[2] = q.v[2];
            sub1.v[3] = v32;
    }
    void
    Tess: :divideArc (const Quad& q,Quad& sub0 ,Quad& sub1) {
            sub0.v[0] = q.v[0];
            sub0.v[1] = v01;
            sub0.v[2] = v32;
            sub0.v[3] = q.v[3];
            sub1.v[0] = v01;
            sub1.v[1] = q.v[1];
            sub1.v[2] = q.v[2];
            sub1.v[3] = v32;
    }
    void
    Tess: :divideArea (const Quad& q,Quad& sub0 ,Quad& sub1) {
            double w = 0.5;
            double delta = 0.25;
            do {
                    const Vector3 v01 = slerp(q.v[0],q.v[1],w);
                    const Vector3 v32 = slerp(q.v[3],q.v[2],w);
                    sub0.v[0] = q.v[0];
                    sub0.v[1] = v01;
                    sub0.v[2] = v32;
                    sub0.v[3] = q.v[3];
                    sub1.v[0] = v01;
                    sub1.v[1] = q.v[1];
                    sub1.v[2] = q.v[2];
                    sub1.v[3] = v32;
                    const double area0 = sub0.sarea();
                    const double area1 = sub1.sarea();
                    if ( area0 < area1 )
                            w += delta;
                    else if ( area0 > area1 )
                            w -= delta;
                    else // exact match
                            break;
                    // update the search variable
                    delta *= 0.5;
            } while ( delta >
    std: :numeric_limits<double>: :epsilon() ) ;}
    FILENAME: vector3.cpp
    #include <cmath>
    #include "vector3.h"
    // constructor
    Vector3: :Vector3(const double _x,const double _y,const double _z)
    : x(_x), y(_y), z(_z)
    {
    }
    // dot product
    double
    Vector3: :dot(const Vector3& v) const
    {
            return x*v.x + y*v.y + z*v.z;
    }
    // normalize
    void
    Vector3: :normalize (void)
    {
            // get the length of the vector
            const double length = sqrtf(dot(*this));
            // if the length is non-zero, divide by the length
            if ( length != 0.0f )
            {
                    // use the reciprocal for efficiency
                    const double rlength = 1.0f/length;
                    x *= rlength;
                    y *= rlength;
                    z *= rlength;
            }
    }
    // write to stream
    std: :ostream& operator<<(std: :ostream& ostr,const Vector3&v)
    {
            ostr << "(" << v.x << "," << v.y << "," << v.z << ")";
```

APPENDIX I
Copyright © 1999 Enroute Inc.
All Rights Reserved

```
            return ostr;
    }
    // cross product
    Vector3 operator*(const Vector3& a,const Vector3& b)
    {
            return Vector3
            a.y*b.z - a.z*b.y,
            a.z*b.x - a.x*b.z,
            a.x*b.y - a.y*b.x);
    }
    // spherical interpolation
    Vector3 slerp(const Vector3& a,const Vector3& b,double weight)
    {
            // special case
            // get normalized input vectors
            Vector3 an = a;
            Vector3 bn = b;
            an.normalize();
            bn.normalize();
            // determine the angle between the vectors
            const double dotab = an.dot(bn);
            const double theta = acosf (dotab);
            // check for antiparallel vectors
            if ( dotab == -1.0 )
                    throw 0;
            // compute the cartesian interpolation factor that
            // corresponds to this angular interpolation factor
            const double cweight = (theta != 0.0) ?
                    0.5*(1.0 + tan(theta*(weight - 0.5))/tan(0.5*theta)) :
                    0.0;
            // do cartesian interpolation
            Vector3 c(
                    an.x*(1.0 - cweight) + bn.x*cweight,
                    an.y*(1.0 - cweight) + bn.y*cweight,
                    an.z*(1.0 - cweight) + bn.z*cweight);
            // normalize the result
            c.normalize();
            return c;
    }
    FILENAME: vector3.h
    #ifndef _VECTOR3_H_
    #def ine _VECTOR3_H_
    #include <iostream>
    //: basic 3D vector
    struct Vector3
    {
            double x,y,z; // vector components
            //: default constructor
            Vector3(void) { }
            //: constructor with initial values
            Vector3(const double xx,const double yy,const double zz):
            //: dot product
            double dot(const Vector3& v) const;
            //: normalize
            // This sets the vector to unit length
            void normalize (void);
    };
    //: i/o
    std: :ostream& operator<<(std: :ostream& ostr,const Vector3& v);
    //: cross product
    Vector3 operator*(const Vector3& a,const Vector3& b);
    //: spherical interpolation
    // This interpolates directions angularly to yield a unit
    // vector. A weight of 0 returns a (normalized); a weight
    // of 1 returns b (normalized). Values of weight in between
    // 0 and 1 return a unit vector interpolated linearly with
    // respect to angle. Values outside [0,1] are undefined.
    Vector3 slerp(const Vector3& a,const Vector3& b,double weight = 0.5);
    #endif // _VECTOR3_H_
    FILENAME: quad.h
    #ifndef _QUAD_H_
    #define _QUAD_H_
    #include "vector3.h"
    //: quadrilateral
    struct Quad
```

-continued

APPENDIX I
Copyright (©) 1999 Enroute Inc.
All Rights Reserved

```
{
    Vector3 v[4]; // vertices
//: default constructor
    Quad(void) { };
//: constructor
    Quad(
        const Vector3& v0,
        const Vector3& v1,
        const Vector3& v2,
        const Vector3& v3);
//: solid angle
// This gives the solid angle subtended by the
// quad as viewed from the origin. No vertex can
// be located at the origin.
    double sarea(void) const;
//: arc length ratio
// This returns the ratio of the longest arc to the
// shortest arc subtended by the quad as viewed from
// the origin. No vertex can be located at the origin.
    double aratio(void) const;
//: rotate vertices
// This moves v1 to v0, v2 to v1, etc. It is useful
// for subdivision along alternating axes.
    void rotateVertices(void);
};
//: write to stream
std: :ostream& operator<<(std: :ostream& ostr,const Quad& q);
#endif // _QUAD_H_
FILENAME:quad.cpp
#include <cmath>
#ifndef M_PI
#define M_PI 3.1415926535897932385
#endif // M_PI
#include "quad.h"
// constructor
Quad: :Quad(
        const Vector3& v0,
        const Vector3& v1,
        const Vector3& v2,
        const Vector3& v3)
{
    v[0] = v0;
    v[1] = v1;
    v[2] = v2;
    v[3] = v3;
}
// solid angle
double
Quad: :sarea(void) const
{
// This macro creates a unit vector called NAME that is the tangent
// on the sphere of the arc between VERTEXA and VERTEXB, at
// VERTEXA. The tangent will point along the arc toward VERTEXB.
#define TANGENT (NAME, VERTEXA, VERTEXB) \
    Vector3 NAME = v[VERTEXA]*v[VERTEXB] \
    *v[VERTEXA]; \
    NAME.normalize ()
    TANGENT(t0a,0,3);
    TANGENT(t1a,1,0);
    TANGENT(t2a,2,1);
    TANGENT(t3a,3,2);
    TANGENT(t0b,0,1);
    TANGENT(t1b,1,2);
    TANGENT(t2b,2,3);
    TANGENT(t3b,3,0);
// vertex angles are the inverse cosine of the dot product
    const double a0 = acos(t0a.dot(t0b));
    const double a1 = acos(t1a.dot(t1b));
    const double a2 = acos(t2a.dot(t2b));
    const double a3 = acos(t3a.dot(t3b));
// solid angle is the sum of the vertex angles − 2PI
    const double solid = a0 + a1 + a2 + a3 − 2.0*M_PI;
    return solid;
}
// arc ratio
```

-continued

APPENDIX I
Copyright (©) 1999 Enroute Inc.
All Rights Reserved

```
// This is the ratio of the largest arc length to the smallest arc length
double
Quad: :aratio(void) const
{
    // create unit vectors
    Vector3 t0 = v[0]; t0.normalize();
    Vector3 t1 = v[1]; t1.normalize();
    Vector3 t2 = v[2]; t2.normalize();
    Vector3 t3 = v[3]; t3.normalize();
    // determine arc lengths
    double minLength = M_PI;
    double maxLength = 0.0;
#define ARC(I,J) { /
    const double length = acos(t##I.dot(t##J)); \
    if ( length < minLength ) minLength = length; \
    if ( length > maxLength ) maxLength = length; \
}
    ARC(0,1);
    ARC(1,2);
    ARC(2,3);
    ARC(3,0);
    return maxLength/minLength;
}
// rotate vertices against the indices void
Quad: :rotateVertices (void)
{
    Vector3 tmp = v[0];
    v[0]= v[1];
    v[1]= v[2];
    v[2]= v[3];
    v[3]= tmp;
}
// write to stream
std: :ostream& operator<<(std: :ostream& ostr,const Quad& q)
{
    ostr << "[" << q.v[0] << "," << q.v[1] << "," <<
q.v[2] << "," << q.v[3] << "]";
    return ostr;
}
```

What is claimed is:

1. A method for creating an environment map from one or more images representing an environment, the method comprising:
   creating a texture map having a plurality of last-generation polygonal curved surfaces as by
      selecting a plurality of initial polygonal curved surfaces; and
      dividing each initial polygonal curved surface to form a plurality of second-generation polygonal curved surfaces;
   determining an image area in the one or more images corresponding to.each polygonal curved surface; and
   coloring each polygonal curved surface based on the corresponding area.

2. The method of claim 1, further comprising dividing each second-generation polygonal curved surface to form a plurality of third-generation polygonal curved surfaces.

3. The method of claim 1, wherein each second-generation polygonal curved surface has an equal area.

4. The method of claim 1, wherein each of the second generation polygonal curved surfaces has N sides, and wherein each of the second-generation polygonal curved surfaces has a common side with N other second-generation polygonal curved surfaces.

5. The method of claim 1, wherein a first vertex of each second-generation polygonal curved surface is at a midpoint of a first side of an initial polygonal curved surface, and wherein a second vertex of the second-generation polygonal curved surface is at a midpoint of a second side of the initial polygonal curved surface.

6. The method of claim 1, further comprising converting the last-generation polygonal curved surface of each initial polygonal curved surface into a two-dimensional polygonal image to form a-plurality of two-dimensional polygonal images; and concatenating the plurality of two-dimensional polygonal images to form the environment map.

7. The method of claim 1, wherein each facet has a resolution of a single pixel.

8. The method of claim 1, wherein determining an image area in the one or more images corresponding to each polygonal curved surface further comprises:

determining a solid angle projection for each facet; and calculating the image area as the intersection of the solid angle with the one or more images.

9. The method of claim 1, wherein said polygonal curved surfaces have a spherical base curve.

10. The method of claim 1, wherein each last-generation polygonal curved surface is a tetragonal curved surface.

11. An environment map creation system for creating an environment map from one or more images representing an environment, the environment map creation system comprising:

an environment map rendering unit configured to receive the one or more images; and a texture projection generation unit coupled to the environment map rendering unit and configured to produce a texture projection comprising a plurality of initial polygonal curved surfaces divided into a plurality of last-generation polygonal curved surfaces, wherein each last generation polygonal curved surface is a tetragonal curved surface;

wherein the environment map rendering unit creates the environment map using the texture projection.

12. The environment map creation system of claim 11, wherein each last-generation polygonal curved surface has an equal area.

13. The environment map creation system of claim 11, wherein in the environment map rendering unit is configured to convert the plurality of last-generation polygonal curved surfaces of each initial polygonal curved surface into a two-dimensional polygonal image to form a plurality of two-dimensional polygonal images.

14. The environment creation system of claim 13, wherein the map rendering unit is configured to concatenate the plurality of two-dimensional polygonal images to form the environment map.

* * * * *